United States Patent [19]
Rossberg et al.

[11] Patent Number: 5,341,469
[45] Date of Patent: Aug. 23, 1994

[54] STRUCTURED TEXT SYSTEM

[75] Inventors: Wayne Rossberg; Edward F. Smith; Angelica Matinkhah, all of Salt Lake City, Utah

[73] Assignee: Arcom Architectural Computer Services, Inc., Salt Lake City, Utah

[21] Appl. No.: 698,996

[22] Filed: May 13, 1991

[51] Int. Cl.$^5$ .............................................. G06F 15/62
[52] U.S. Cl. .................................. 395/145; 395/144; 395/600
[58] Field of Search ..................... 395/144, 600, 145; 364/401

[56] References Cited

U.S. PATENT DOCUMENTS

| | | | |
|---|---|---|---|
| 4,181,954 | 1/1980 | Rosenthal et al. | 364/520 |
| 4,700,317 | 10/1987 | Watanabe et al. | 364/488 |
| 4,947,322 | 8/1990 | Tenma et al. | 364/401 |
| 4,961,148 | 10/1990 | Holda et al. | 364/468 |

OTHER PUBLICATIONS

DeMaria et al, *Working with dBaseMac-Pushing Productivity to the Limit (dBase Mac Reference)*, 1988, pp. 363–464.

*Primary Examiner*—Gary V. Harkcom
*Assistant Examiner*—Joseph Feild
*Attorney, Agent, or Firm*—M. Reid Russell

[57] ABSTRACT

A structured text system for generating a finished project plans and specifications for constructing a building, the system including a master specification and standardized information embedded in other documents. The system uses keynote references that are inserted into other documents, such as drawings produced by a CAD system, to construct a partial project knowledge base, which knowledge base is then used to guide the editing of a master specification to yield an initial project plans and specifications. The keynote references are found in a catalog of standardized notes and are arranged to be searched by their attributes, using an interactive index utility. The keynote references are included on the CAD drawings, or like computer readable documents, from which they may be extracted for later use in constructing or updating a project knowledge base. The system provides a human interactive editing program that is used to augment through questions and answers the project knowledge base with information not present in the referenced keynote. Finally, the master specification is edited using the information in the project knowledge base to yield the finished project specification in the form of a set of document files which is then edited to form a final plans and specifications for project construction.

24 Claims, 59 Drawing Sheets

DOCUMENT RELATIONS

ELEMENT

| Doc | ID | Type | Node | Data |
|---|---|---|---|---|

TEXT

| ID | Symbol | Text |
|---|---|---|

CONTROL

| ID | Cmd |
|---|---|

QUESTION

| ID | Symbol | Text | Require | Allow | Alt |
|---|---|---|---|---|---|

ALTERNATIVE

| ID | Node | Symbol | Text | Cmd1 | Cmd2 | Next |
|---|---|---|---|---|---|---|

COMMAND

| ID | Type | Data | Next |
|---|---|---|---|

IF

| ID | Node | Cmd1 | Cmd2 |
|---|---|---|---|

ANSWER

| ID | Ques | Ans |
|---|---|---|

REQUIRE

| ID | Doc |
|---|---|

DELETE

| ID | Elem |
|---|---|

NODE

| ID | Type | Arg1 | Arg2 |
|---|---|---|---|

ARGUMENT

| ID | Type | Object |
|---|---|---|

FIG. 3A

KEYNOTE MAP RELATIONS

NOTE

| Label | Desc |
|---|---|

LEVEL

| ID | Parent |
|---|---|

ATTRIBUTE

| Level | Label | Desc |
|---|---|---|

PROPERTY

| Level | Attr | Label | Desc |
|---|---|---|---|

MAP

| Note | Ques | Ans |
|---|---|---|

NOTECHAR

| Note | Level | Attr | Prop |
|---|---|---|---|

LEVELCHAR

| Level | Attr | Prop |
|---|---|---|

FIG. 3B

PROJECT KNOWLEDGE BASE RELATIONS

ANSWERS

| Proj | Src | Ques | Ans |
|---|---|---|---|

KEYNOTES

| Proj | Src | Note |
|---|---|---|

FIG. 3C

NOTATIONAL CONVENTIONS

- Constants are indicated in traditional form (i.e., numbers — 0, 1, etc.; character strings — "This is a string", the Boolean values — true, false; and relation names — ELEMENT, NODE, etc.)

- Sets are indicated in traditional form using enumeration (e.g. $\{1, 2, 3, 5, 7\}$) or prescription (e.g. $\{i \mid 0 < i < 10 \wedge i \text{ is prime}\}$).

- Variables will be denoted by single letters with optional superscripts, subscripts, and primes. Set valued variables will use upper case letters (i.e., $A$, $B'$, etc.) and scaler variables will use lower case letters (i.e., $a$, $b_x$, $c^2$, $d_a^1$, $e'$, etc.)

- Tuples will be denoted as a comma separated list of values enclosed in parenthesis (e.g. $(d_e, i_e, t_e, n_e, a_e)$).

- Function application is denoted in the usual way with the function definition taking the typical form used in math tables.

For example:

...factorial(6)...

Where:

$$\text{factorial}(a) = \begin{cases} 1 & \text{if } a \leq 0 \\ a * \text{factorial}(a-1) & \text{otherwise} \end{cases}$$

FIG. 4A-1

- The arithmetic operators (i.e., $+, -, *,$ and $/$) have the traditional precedence.

- The set operators (i.e., $\cup, \cap,$ and $-$) have lower precedence than the arithmetic operators.

- The relational operators (i.e., $<, \leq, =, \neq, \geq, >, \in, \notin, \subset,$ and $\subseteq$) have lower precedence than the set operators.

- The logical operators (i.e., $\neg, \wedge, \vee,$ and $\rightarrow$) have lower precedence than the relational operators with the unary operator $\neg$ taking precedence over the binary operators which all have the same precedence.

- The quantifiers $\forall$ and $\exists$ have precedence intermediate between that of the relational operators and the logical operators. The following shorthand notation is used in quantified formulas:

$\forall a_1, a_2, \ldots, a_n\ e \equiv \forall a_1 \forall a_2 \ldots \forall a_n\ e$
$\exists a_1, a_2, \ldots, a_n\ e \equiv \exists a_1 \exists a_2 \ldots \exists a_n\ e$
$\forall (a_1, a_2, \ldots, a_n) \in S\ e \equiv \forall a_1, a_2, \ldots, a_n\ ((a_1, a_2, \ldots, a_n) \in S \rightarrow e)$
$\exists (a_1, a_2, \ldots, a_n) \in S\ e \equiv \exists a_1, a_2, \ldots, a_n\ ((a_1, a_2, \ldots, a_n) \in S \wedge e)$

FIG. 4A-2

PRIMARY DOCUMENT CONSTRAINTS (1) $\forall (d_e, i_e, t_e, n_e, a_e) \in \text{ELEMENT}$
$(i_e \neq 0 \land$
$(n_e = 0 \lor \exists (i_n, t_n, a_n^1, a_n^2) \in \text{NODE}(n_e = i_n \land \neg \text{innode}(d_e, i_e, n_e))) \land$
$((t_e = \text{"Text"} \land \exists (i_t, s_t, t_t) \in \text{TEXT } a_e = i_t) \lor$
$(t_e = \text{"Control"} \land \exists (i_c, q_c) \in \text{CONTROL } a_e = i_c) \lor$
$(t_e = \text{"Question"} \land \exists (i_q, s_q, t_q, r_q, a_q, l_q) \in \text{QUESTION } a_e = i_q)))$ Where:

$$\text{innode}(d, e, n) = \begin{cases} \text{inarg}(d, e, a^1) \lor \text{inarg}(d, e, a^2) & \text{if } \exists (i, t, a^1, a^2) \in \text{NODE} \\ & (n = i \land \\ & (t = \text{"And"} \lor t = \text{"Or"})) \\ \text{inarg}(d, e, a^2) & \text{if } \exists (i, t, a^1, a^2) \in \text{NODE} \\ & (n = i \land t = \text{"Not"}) \\ \text{false} & \text{otherwise} \end{cases}$$

$$\text{inarg}(d, e, a) = \begin{cases} \text{true} & \text{if } \exists (i, t, o) \in \text{ARGUMENT} \\ & (a = i \land t = \text{"Ref"} \land e = o) \\ \text{innode}(d, e, n_e) & \text{if } \exists (i_a, t_a, o_a) \in \text{ARGUMENT} \\ & \exists (d_e, i_c, t_e, n_e, a_e) \in \text{ELEMENT} \\ & (a = i_a \land t_a = \text{"Ref"} \land \\ & e \neq o_a \land d = d_e \land o_a = i_e) \\ \text{innode}(d, e, o) & \text{if } \exists (i, t, o) \in \text{ARGUMENT} \\ & (a = i \land t = \text{"Node"}) \\ \text{false} & \text{otherwise} \end{cases}$$

FIG. 4B

SPECIFIC ELEMENT CONSTRAINTS (2) $\forall (i_c, c_c) \in \text{CONTROL}$
$(c_c = 0 \vee \exists (i_d, t_d, d_d, x_d) \in \text{COMMAND } c_c = i_d)$ (3) $\forall (i_q, s_q, t_q, r_q, a_q, l_q) \in \text{QUESTION}$
$\exists (i_a, n_a, s_a, t_a, c_a^1, c_a^2, x_a) \in \text{ALTERNATIVE}$
$(l_q = i_a \wedge 0 \leq r_q \leq a_q \leq \text{len}(l_q))$ Where:

$$\text{len}(l) = \begin{cases} 1 + \text{len}(x) & \text{if } \exists (i, n, s, t, c^1, c^2, x) \in \text{ALTERNATIVE } i = l \\ 0 & \text{otherwise} \end{cases}$$

(4) $\forall (i_a, n_a, s_a, t_a, c_a^1, c_a^2, x_a) \in \text{ALTERNATIVE}$
$(i_a \neq 0 \wedge \neg \text{in}(i_a, x_a) \wedge s_a \notin \text{sym}(x_a) \wedge$
$(n_a = 0 \vee \exists (i_n, t_n, a_n^1, a_n^2) \in \text{NODE } n_a = i_n) \wedge$
$(c_a^1 = 0 \vee \exists (i_c, t_c, d_c, x_c) \in \text{COMMAND } c_a^1 = i_c) \wedge$
$(c_a^2 = 0 \vee \exists (i_c, t_c, d_c, x_c) \in \text{COMMAND } c_a^2 = i_c) \wedge$
$(x_a = 0 \vee \exists (i_x, n_x, s_x, t_x, c_x^1, c_x^2, x_x) \in \text{ALTERNATIVE } x_a = i_x))$ Where:

$$\text{in}(a, l) = \begin{cases} \text{true} & \text{if } l = a \\ \text{in}(a, x) & \text{if } l \neq a \wedge \\ & \exists (i, n, s, t, c^1, c^2, x) \in \text{ALTERNATIVE } l = i \\ \text{false} & \text{otherwise} \end{cases}$$

$$\text{sym}(l) = \begin{cases} \text{sym}(x) \cup \{s\} & \text{if } \exists (i, n, s, t, c^1, c^2, x) \in \text{ALTERNATIVE } l = i \\ \emptyset & \text{otherwise} \end{cases}$$

FIG. 4C

DOCUMENT COMMAND CONSTRAINTS (5) $\forall (i_c, t_c, d_c, x_c) \in$ COMMAND
$(i_c \neq 0 \land \neg\text{in}(i_c, x_c) \land$
$((t_c = \text{``If''} \land \exists(i_i, n_i, c_i^1, c_i^2) \in \text{IF}$
$(d_c = i_i \land \neg\text{in}(i_c, c_i^1) \land \neg\text{in}(i_c, c_i^2))) \lor$
$(t_c = \text{``Answer''} \land \exists(i_a, q_a, a_a) \in \text{ANSWER } d_c = i_a) \lor$
$(t_c = \text{``Require''} \land \exists(i_r, d_r) \in \text{REQUIRE } d_c = i_r) \lor$
$(t_c = \text{``Delete''} \land \exists(i_d, d_d, e_d) \in \text{DELETE } d_c = i_d)))$ Where:

$$\text{in}(c, l) = \begin{cases} \text{true} & \text{if } l = c \\ \text{in}(c, x) & \text{if } l \neq c \land \\ & \exists(i, t, d, x) \in \text{COMMAND} \\ & (l = i \land t \neq \text{``If''}) \\ \text{in}(c, x_c) \lor \text{in}(c, c_i^1) \lor \text{in}(c, c_i^2) & \text{if } l \neq c \land \\ & \exists(i_c, t_c, d_c, x_c) \in \text{COMMAND} \\ & \exists(i_i, n_i, c_i^1, c_i^2) \in \text{IF} \\ & (l = i_c \land t_c = \text{``If''} \land d_c = i_i) \\ \text{false} & \text{otherwise} \end{cases}$$

(6) $\forall (i_i, n_i, c_i^1, c_i^2) \in$ IF
$((n_i = 0 \lor \exists(i_n, t_n, a_n^1, a_n^2) \in \text{NODE } n_i = i_n) \land$
$(c_a^1 = 0 \lor \exists(i_c, t_c, d_c, x_c) \in \text{COMMAND } c_a^1 = i_c) \land$
$(c_a^2 = 0 \lor \exists(i_c, t_c, d_c, x_c) \in \text{COMMAND } c_a^2 = i_c))$ (7) $\forall (i_w, q_w, a_w) \in$ ANSWER
$\exists(i_q, s_q, t_q, r_q, a_q, l_q) \in$ QUESTION
$\exists(i_a, n_a, s_a, t_a, c_a^1, c_a^2, x_a) \in$ ALTERNATIVE
$(q_w = s_q \land a_w = s_a \land \text{in}(i_a, l_q))$ Where:

$$\text{in}(a, l) = \begin{cases} \text{true} & \text{if } l = a \\ \text{in}(a, x) & \text{if } l \neq a \land \\ & \exists(i, n, s, t, c^1, c^2, x) \in \text{ALTERNATIVE } l = i \\ \text{false} & \text{otherwise} \end{cases}$$

FIG. 4D

DOCUMENT EXPRESSION CONSTRAINTS (8) $\forall (i_n, t_n, a_n^1, a_n^2) \in \text{NODE}$
$(i_n \neq 0 \land$
$(((t_n = \text{``And''} \lor t_n = \text{``Or''}) \land$
$\exists (i_1, t_1, o_1) \in \text{ARGUMENT}$
$\exists (i_2, t_2, o_2) \in \text{ARGUMENT}$
$(a_n^1 = i_1 \land a_n^2 = i_2 \land \neg \text{inarg}(i_n, a_n^1) \land \neg \text{inarg}(i_n, a_n^2))) \lor$
$(t_n = \text{``Not''} \land$
$\exists (i_2, t_2, o_2) \in \text{ARGUMENT}$
$(a_n^2 = i_2 \land \neg \text{inarg}(i_n, a_n^2)))))$ Where:

$$\text{inarg}(n, a) = \begin{cases} \text{true} & \text{if } \exists (i, t, o) \in \text{ARGUMENT} \\ & (a = i \land t = \text{``Node''} \land n = o) \\ \text{innode}(n, o) & \text{if } \exists (i, t, o) \in \text{ARGUMENT} \\ & (a = i \land t = \text{``Node''} \land n \neq o) \\ \text{false} & \text{otherwise} \end{cases}$$

$$\text{innode}(n, n') = \begin{cases} \text{inarg}(n, a^1) \lor \text{inarg}(n, a^2) & \text{if } \exists (i, t, a^1, a^2) \in \text{NODE} \\ & (n' = i \land \\ & (t = \text{``And''} \lor t = \text{``Or''})) \\ \text{inarg}(n, a^2) & \text{if } \exists (i, t, a^1, a^2) \in \text{NODE} \\ & (n' = i \land t = \text{``Not''}) \\ \text{false} & \text{otherwise} \end{cases}$$

(9) $\forall (i_a, t_a, o_a) \in \text{ARGUMENT}$
$(t_a = \text{``Node''} \rightarrow \exists (i_n, t_n, a_n^1, a_n^2) \in \text{NODE } o_a = i_n)$

FIG. 4E

KEYNOTE MAP CONSTRAINTS

(10) $\forall (i_l, p_l) \in \text{LEVEL}$
$(i_l \neq 0 \land \neg \text{onpath}(i_l, p_l) \land$
$(p_l = 0 \to \neg \exists (i, p) \in \text{LEVEL} \ (i_l \neq i \land p = 0)) \land$
$(p_l \neq 0 \to \exists (i, p) \in \text{LEVEL} \ p_l = i) \land$
$\neq \exists (i, p) \in \text{LEVEL} \ (i_l \neq i \land p_l = p \land \text{key}(i_l) = \text{key}(i)))$ Where:
$$\text{onpath}(v, p) = \begin{cases} \text{true} & \text{if } v = p \\ \text{onpath}(v, p') & \text{if } \exists (i, p') \in \text{LEVEL} \ i = p \\ \text{false} & \text{otherwise} \end{cases}$$

$$\text{key}(v) = \{(a, p) \mid \exists (v', a', p') \in \text{LEVELCHAR} \ (v = v' \land a = a' \land p = p')\}$$

(11) $\forall (v_a, l_a, d_a) \in \text{ATTRIBUTE}$
$\exists (i, p) \in \text{LEVEL} \ v_a = i$

(12) $\forall (v_p, a_p, l_p, d_p) \in \text{PROPERTY}$
$\exists (v, l, d) \in \text{ATTRIBUTE} \ (v_p = v \land a_p = l)$

(13) $\forall (n_p, q_p, a_p) \in \text{MAP}$
$\exists (l_n, d_n) \in \text{NOTE}$
$\exists (i_q, s_q, t_q, r_q, a_q, l_q) \in \text{QUESTION}$
$\exists (i_a, n_a, s_a, t_a, c_a^1, c_a^2, x_a) \in \text{ALTERNATIVE}$
$(n_p = l_n \land q_p = s_q \land a_p = s_a \land \text{in}(i_a, l_q))$ Where:
$$\text{in}(a, l) = \begin{cases} \text{true} & \text{if } l = a \\ \text{in}(a, x) & \text{if } l \neq a \land \\ & \exists (i, n, s, t, c^1, c^2, x) \in \text{ALTERNATIVE} \ l = i \\ \text{false} & \text{otherwise} \end{cases}$$

(14) $\forall (n_c, v_c, a_c, p_c) \in \text{NOTECHAR}$
$\exists (l_n, d_n) \in \text{NOTE}$
$\exists (v_p, a_p, l_p, d_p) \in \text{PROPERTY}$
$(n_c = l_n \land v_c = v_p \land a_c = a_p \land p_c = l_p)$

(15) $\forall (v_c, a_c, p_c) \in \text{LEVELCHAR}$
$\exists (i_l, p_l) \in \text{LEVEL}$
$\exists (v_p, a_p, l_p, d_p) \in \text{PROPERTY}$
$(v_c = i_l \land p_l = v_p \land a_c = a_p \land p_c = l_p)$

FIG. 4F

KNOWLEDGE BASE CONSTRAINTS

(16) $\forall (p_w, s_w, q_w, a_w) \in \text{ANSWERS}$
$\exists (i_q, s_q, t_q, r_q, a_q, l_q) \in \text{QUESTION}$
$\exists (i_a, n_a, s_a, t_a, c_a^1, c_a^2, x_a) \in \text{ALTERNATIVE}$
$(q_w = s_q \land a_w = s_a \land \text{in}(i_a, l_q))$ Where:

$$\text{in}(a, l) = \begin{cases} \text{true} & \text{if } l = a \\ \text{in}(a, x) & \text{if } l \neq a \land \\ & \exists (i, n, s, t, c^1, c^2, x) \in \text{ALTERNATIVE } l = i \\ \text{false} & \text{otherwise} \end{cases}$$

(17) $\forall (p_k, s_k, n_k) \in \text{KEYNOTES}$
$\exists (l, d) \in \text{NOTE } n_k = l$

FIG. 4G

EDITING FUNCTIONS $$\text{prjspc}(p,d) = \begin{cases} F & \text{if } \exists C, D, F\left((C,D) = \text{edit}(p,d) \wedge \right. \\ & \left. F = \{f \mid \exists d' \in C\ f = \text{outdoc}(d', D)\}\right) \\ \emptyset & \text{otherwise} \end{cases}$$

$$\text{edit}(p,d) = \begin{cases} (C,D) & \text{if } \exists A, R, C, D\ (A, R, C, D) = \text{prp}(\text{kb}(p), \{d\}, \emptyset, \emptyset) \\ (\emptyset, \emptyset) & \text{otherwise} \end{cases}$$

$$\text{outdoc}(d, D) = \text{close}(\text{outelem}(\text{open}(d), d, \text{first}(d), D))$$

$$\text{outelem}(f, d, e, D) = \begin{cases} f' & \text{if } \exists (d', i, t, n, a) \in \text{ELEMENT}\ \exists f' \\ & (d = d' \wedge e = i\ \wedge \\ & t = \text{``Text''} \wedge (d, e) \notin D \wedge \text{support}(d, n, D) \wedge \\ & f' = \text{outelem}(\text{write}(f, a), d, \text{next}(d, e), D)) \\ f' & \text{if } \exists (d', i, t, n, a) \in \text{ELEMENT}\ \exists f' \\ & (d = d' \wedge e = i\ \wedge \\ & (t \neq \text{``Text''} \vee (d, e) \in D \vee \neg\text{support}(d, n, D)) \wedge \\ & f' = \text{outelem}(f, d, \text{next}(d, e), D)) \\ f & \text{otherwise} \end{cases}$$

FIG. 5A

PROCESSING FUNCTIONS $$\text{prp}(A, R, C, D) = \begin{cases} \text{prp}(A', R', C', D') & \text{if } \exists A', R', C', D', d \\ & (d \in R \land (A', R', C', D') = \\ & \text{prd}(d, A, R - \{d\}, C \cup \{d\}, D)) \\ (A, R, C, D) & \text{otherwise} \end{cases}$$

$$\text{prd}(d, A, R, C, D) = \begin{cases} (A'', R'', C'', D'') & \text{if } \exists A', R', C', D', A'', R'', C'', D'', E \\ & (\text{first}(d) \neq 0 \land \\ & E = \{(d', e) \mid d' = d \land (d, e) \in D\} \land \\ & (A', R', C', D') = \\ & \text{prq}(d, \text{first}(d), A, R, C, D - E) \land \\ & (A'', R'', C'', D'') = \\ & \text{prc}(d, \text{first}(d), A', R', C', D')) \\ (A, R, C, D) & \text{otherwise} \end{cases}$$

$$\text{prq}(d, e, A, R, C, D) = \begin{cases} \text{prq}(d, e', A', R', C', D') & \text{if } \exists (d', i, t, n, a) \in \text{ELEMENT} \\ & \exists A', R', C', D', e' \ (d = d' \land e = i \land \\ & t = \text{"Question"} \land (d, e) \notin D \land \\ & \text{support}(d, n, D) \land \\ & (A', R', C', D') = \\ & \text{exq}(d, a, A, R, C, D) \land \\ & e' = \text{next}(d, e)) \\ \text{prq}(d, e', A, R, C, D) & \text{if } \exists (d', i, t, n, a) \in \text{ELEMENT} \\ & \exists e' \ (d = d' \land e = i \land \\ & (t \neq \text{"Question"} \lor (d, e) \in D \lor \\ & \neg \text{support}(d, n, D)) \land \\ & e' = \text{next}(d, e)) \\ (A, R, C, D) & \text{otherwise} \end{cases}$$

$$\text{prc}(d, e, A, R, C, D) = \begin{cases} \text{prc}(d, e', A', R', C', D') & \text{if } \exists (d', i, t, n, a) \in \text{ELEMENT} \\ & \exists A', R', C', D', e' \ (d = d' \land e = i \land \\ & t = \text{"Control"} \land (d, e) \notin D \land \\ & \text{support}(d, n, D) \land \\ & (A', R', C', D') = \\ & \text{exr}(d, a, A, R, C, D) \land \\ & e' = \text{next}(d, e)) \\ \text{prc}(d, e', A, R, C, D) & \text{if } \exists (d', i, t, n, a) \in \text{ELEMENT} \\ & \exists e' \ (d = d' \land e = i \land \\ & (t \neq \text{"Control"} \lor (d, e) \in D \lor \\ & \neg \text{support}(d, n, D)) \land \\ & e' = \text{next}(d, e)) \\ (A, R, C, D) & \text{otherwise} \end{cases}$$

FIG. 5B

ELEMENT EXECUTION FUNCTIONS $$\text{exr}(d,c,A,R,C,D) = \begin{cases} \text{exs}(d,s,A,R,C,D) & \text{if } \exists(i,s) \in \text{CONTROL } c = i \\ (A,R,C,D) & \text{otherwise} \end{cases}$$

$$\text{exq}(d,q,A,R,C,D) = \begin{cases} \text{exl}(d,l,s,A,R,C,D) & \text{if } \exists(i,s,t,r,a,l) \in \text{QUESTION} \\ & \text{answered}(d,q,A,D) \\ (A,R,C,D) & \text{otherwise} \end{cases}$$

$$\text{answered}(d,q,A,D) = \begin{cases} \text{true} & \text{if } \exists(i,s,t,r,a,l) \in \text{QUESTION} \\ & (q = i \wedge r \leq \text{anscnt}(d,l,s,A,D) \leq a) \\ \text{false} & \text{otherwise} \end{cases}$$

$$\text{anscnt}(d,l,q,A,D) = \begin{cases} 1 + \text{anscnt}(d,x,q,A,D) & \text{if } \exists(i,n,s,t,c^1,c^2,x) \in \\ & \text{ALTERNATIVE} \\ & (l = i \wedge \text{support}(d,n,D) \wedge \\ & \exists(q',a') \in A \ (q = q' \wedge s = a')) \\ \text{anscnt}(d,x,q,A,D) & \text{if } \exists(i,n,s,t,c^1,c^2,x) \in \\ & \text{ALTERNATIVE} \\ & (l = i \wedge \text{support}(d,n,D) \wedge \\ & \neg\exists(q',a') \in A \ (q = q' \wedge s = a')) \\ 0 & \text{otherwise} \end{cases}$$

$$\text{exl}(d,l,q,A,R,C,D) = \begin{cases} \text{exl}(d,x,q,A',R',C',D') & \text{if } \exists(i,n,s,t,c^1,c^2,x) \in \\ & \text{ALTERNATIVE} \\ & \exists A',R',C',D' \ (l = i \wedge \\ & (A',R',C',D') = \\ & \text{exa}(d,l,q,A,R,C,D)) \\ (A,R,C,D) & \text{otherwise} \end{cases}$$

$$\text{exa}(d,a,q,A,R,C,D) = \begin{cases} \text{exs}(d,c^1,A,R,C,D) & \text{if } \exists(i,n,s,t,c^1,c^2,x) \in \\ & \text{ALTERNATIVE} \\ & (a = i \wedge \text{support}(d,n,D) \wedge \\ & \exists(q',a') \in A \ (q = q' \wedge s = a')) \\ \text{exs}(d,c^2,A,R,C,D) & \text{if } \exists(i,n,s,t,c^1,c^2,x) \in \\ & \text{ALTERNATIVE} \\ & (a = i \wedge \text{support}(d,n,D) \wedge \\ & \neg\exists(q',a') \in A \ (q = q' \wedge s = a')) \\ (A,R,C,D) & \text{otherwise} \end{cases}$$

FIG. 5C

COMMAND EXECUTION FUNCTIONS $$\text{exs}(d, c, A, R, C, D) = \begin{cases} \text{exs}(d, x, A', R', C', D') & \text{if } \exists (i, t, a, x) \in \text{COMMAND} \\ & \exists A', R', C', D' \\ & (c = i \land (A', R', C', D') = \\ & \text{exc}(d, c, A, R, C, D)) \\ (A, R, C, D) & \text{otherwise} \end{cases}$$

$$\text{exc}(d, c, A, R, C, D) = \begin{cases} \text{exs}(d, c^1, A, R, C, D) & \text{if } \exists (i_c, t, a, x) \in \text{COMMAND} \\ & \exists (i_i, n, c^1, c^2) \in \text{IF} \\ & (c = i_c \land t = \text{``If''} \land a = i_i \land \\ & \text{support}(d, n, D)) \\ \text{exs}(d, c^2, A, R, C, D) & \text{if } \exists (i_c, t, a, x) \in \text{COMMAND} \\ & \exists (i_i, n, c^1, c^2) \in \text{IF} \\ & (c = i_c \land t = \text{``If''} \land a = i_i \land \\ & \neg\text{support}(d, n, D)) \\ (A', R', C', D) & \text{if } \exists (i_c, t, a_c, x) \in \text{COMMAND} \\ & \exists (i_a, q, a_a) \in \text{ANSWER} \\ & \exists A', R', C' \\ & (c = i_c \land t = \text{``Answer''} \land a_c = i_a \land \\ & (A', R', C') = \text{assert}(q, a_a, A, R, C)) \\ (A, R \cup \{d'\}, C, D) & \text{if } \exists (i_c, t, a, x) \in \text{COMMAND} \\ & \exists (i_r, d') \in \text{REQUIRE} \\ & (c = i_c \land t = \text{``Require''} \land a = i_r \land \\ & d' \notin C) \\ (A, R, C, D \cup \{(d, e)\}) & \text{if } \exists (i_c, t, a, x) \in \text{COMMAND} \\ & \exists (i_d, e) \in \text{DELETE} \\ & (c = i_c \land t = \text{``Delete''} \land a = i_d) \\ (A, R, C, D) & \text{otherwise} \end{cases}$$

$$\text{assert}(q, a, A, R, C) = \begin{cases} (A', R', C') & \text{if } (q, a) \notin A \land \\ & \exists A', R', C' \\ & (A' = A \cup \{(q, a)\} \land \\ & R' = R \cup (C \cap \text{has}(q)) \land \\ & C' = C - \text{has}(q)) \\ (A, R, C) & \text{otherwise} \end{cases}$$

$$\text{has}(q) = \left\{ d \;\middle|\; \begin{array}{l} \exists (d_e, i_e, t_e, n_e, a_e) \in \text{ELEMENT} \\ \exists (i_q, s_q, t_q, r_q, a_q, l_q) \in \text{QUESTION} \\ (d = d_e \land t_e = \text{``Question''} \land a_e = i_q \land q = s_q) \end{array} \right\}$$

FIG. 5D

SUPPORT EXPRESSION EVALUATION FUNCTIONS $$\text{support}(d, n, D) = \begin{cases} \text{suparg}(d, a^1, D) \land \text{suparg}(d, a^2, D) & \text{if } \exists (i, t, a^1, a^2) \in \text{NODE} \\ & (n = i \land t = \text{``And''}) \\ \text{suparg}(d, a^1, D) \lor \text{suparg}(d, a^2, D) & \text{if } \exists (i, t, a^1, a^2) \in \text{NODE} \\ & (n = i \land t = \text{``Or''}) \\ \neg \text{suparg}(d, a^2, D) & \text{if } \exists (i, t, a^1, a^2) \in \text{NODE} \\ & (n = i \land t = \text{``Not''}) \\ \text{true} & \text{otherwise} \end{cases}$$

$$\text{suparg}(d, a, D) = \begin{cases} \text{support}(d, o, D) & \text{if } \exists (i, t, o) \in \text{ARGUMENT} \\ & (a = i \land t = \text{``Node''}) \\ \text{support}(d, n_e, D) & \text{if } \exists (i_a, t_a, o_a) \in \text{ARGUMENT} \\ & \exists (d_e, i_e, t_e, n_e, a_e) \in \text{ELEMENT} \\ & (a = i_a \land t_a = \text{``Ref''} \land d = d_e \land o_a = i_e \land \\ & (d, o_a) \notin D) \\ \text{false} & \text{otherwise} \end{cases}$$

FIG. 5E

DOCUMENT TRAVERSAL FUNCTIONS $$\text{first}(d) = \begin{cases} e_1 & \text{if } \exists(d_1, e_1, t_1, n_1, a_1) \in \text{ELEMENT} \\ & (d = d_1 \wedge \neg \exists(d_2, e_2, t_2, n_2, a_2) \in \text{ELEMENT} \\ & (d_1 = d_2 \wedge e_2 < e_1)) \\ 0 & \text{otherwise} \end{cases}$$

$$\text{next}(d, e) = \begin{cases} e_1 & \text{if } \exists(d_1, e_1, t_1, n_1, a_1) \in \text{ELEMENT} \\ & (d = d_1 \wedge e < e_1 \wedge \neg \exists(d_2, e_2, t_2, n_2, a_2) \in \text{ELEMENT} \\ & (d_1 = d_2 \wedge e < e_2 < e_1)) \\ 0 & \text{otherwise} \end{cases}$$

FIG. 5F

KEYNOTE MAP FUNCTIONS $$\text{sub}(v, P) = \begin{cases} i_l & \text{if } \exists (i_l, p_l) \in \text{LEVEL}\,(v = p_l \wedge \\ & \{(a,p) \mid \exists (l_c, a_c, p_c) \in \text{LEVELCHAR}\,(i_l = l_c \wedge a = a_c \wedge p = p_c)\} = \\ & \{(a,p) \mid \exists (v_p, a_p, p_p) \in P\,(v = v_p \wedge a = a_p \wedge p = p_p)\}) \\ 0 & \text{otherwise} \end{cases}$$

$$\text{attrs}(v) = \{a \mid \exists (v', b, d) \in \text{ATTRIBUTE}\,(v = v' \wedge a = b)\}$$

$$\text{props}(v, a) = \{p \mid \exists (v', a', b, d) \in \text{PROPERTY}\,(v = v' \wedge a = a' \wedge p = b)\}$$

$$\text{notes}(P) = \begin{cases} \text{notes}(P - \{(v, a, p)\}) \cap \text{pnotes}(v, a, p) & \text{if } \exists (v, a, p) \in P \\ \{n \mid \exists (l, d) \in \text{NOTE}\,n = l\} & \text{otherwise} \end{cases}$$

$$\text{pnotes}(v, a, p) = \{n \mid \exists (n', v', a', p') \in \text{NOTECHAR}\,(n = n' \wedge v = v' \wedge a = a' \wedge p = p')\}$$

FIG. 5G

KNOWLEDGE BASE FUNCTIONS $$kb(p) = \left\{ (q,a) \middle| \begin{array}{l} (\exists (p_a, s_a, q_a, a_a) \in \text{ANSWERS } (p = p_a \land q = q_a \land a = a_a)) \lor \\ (\exists (p_k, s_k, n_k) \in \text{KEYNOTES } \exists (n_m, q_m, a_m) \in \text{MAP} \\ (p = p_k \land n_k = n_m \land q = q_m \land a = a_m)) \end{array} \right\}$$

FIG. 5H

TERMINAL GRAMMAR SYMBOLS

- ⟨empty⟩ — nothing.

- ⟨number⟩ — a sequence of digits whose corresponding numeric value is representable as an unsigned long (i.e., 32-bit) integer.

- ⟨block⟩ — a string of text enclosed in square brackets where any embedded square brackets (i.e., [ or ]) are preceded by a backslash (i.e., \). The following rendering sequences are also permitted:

- \U — begin underline
    - \u — end underline
    - \B — begin bold
    - \b — end bold
    - \H — begin superscript
    - \h — end superscript
    - \L — begin subscript
    - \l — end subscript

FIG. 7A-1

Multiple adjacent occurrences of whitespace characters (i.e., spaces, tabs, new lines, etc.) are treated as a single space. However, the punctuation marks . , : ; ? ! and " may be preceded by a \ to force an extra trailing space. This extra space is only inserted if the punctuation mark is followed by whitespace. Any other character preceded by a backslash is taken literally (e.g. \\ is \ and \␣ is a non-whitespace space).

- ⟨symbol⟩ — a string of case insensitive characters from the set {A-Z, 0-9, $, _, ., -} where at least one of the characters is not a digit.

- ⟨file⟩ — a valid file specification for the operating system enclosed in quotation marks (i.e., ").

Tokens may be separated by any amount of whitespace (i.e., spaces, tabs, new lines, form feeds, etc.) or in cases where no ambiguity results, by no whitespace.

FIG. 7A-2

STRUCTURED TEXT DOCUMENT GRAMMAR

⟨document⟩ ⟶ ⟨empty⟩
    | ⟨document⟩ { ⟨element id⟩ , /TEXT , ⟨support expression⟩ } ⟨text⟩
    | ⟨document⟩ { ⟨element id⟩ , /CONTROL , ⟨support expression⟩ } ⟨control⟩
    | ⟨document⟩ { ⟨element id⟩ , /QUESTION , ⟨support expression⟩ } ⟨question⟩
⟨text⟩ ⟶ ⟨symbol⟩⟨block⟩
⟨control⟩ ⟶ ⟨commands⟩
⟨question⟩ ⟶ ⟨symbol⟩⟨block⟩⟨require⟩⟨allow⟩⟨alternative⟩
⟨alternative⟩ ⟶ ⟨support expression⟩⟨symbol⟩⟨block⟩⟨command⟩
    | ⟨support expression⟩⟨symbol⟩⟨block⟩⟨command⟩ /ELSE ⟨command⟩
⟨commands⟩ ⟶ ⟨command⟩
    | ⟨commands⟩⟨command⟩
⟨command⟩ ⟶ ⟨empty⟩
    | ( ⟨command⟩ )
    | /IF ⟨support expression⟩⟨command⟩
    | /IF ⟨support expression⟩⟨command⟩ /ELSE ⟨command⟩
    | /ANSWER ⟨question name⟩⟨answer name⟩
    | /REQUIRE ⟨file⟩
    | /DELETE ⟨element id⟩
⟨support expression⟩ ⟶ ⟨empty⟩
    | ⟨expression⟩
⟨expression⟩ ⟶ ⟨term⟩
    | ⟨expression⟩ | ⟨term⟩
⟨term⟩ ⟶ ⟨factor⟩
    | ⟨term⟩ & ⟨factor⟩
⟨factor⟩ ⟶ ⟨atom⟩
    | ~ ⟨atom⟩
⟨atom⟩ ⟶ ( ⟨expression⟩ )
    | ⟨element id⟩
⟨element id⟩ ⟶ ⟨number⟩
⟨require⟩ ⟶ ⟨number⟩
⟨allow⟩ ⟶ ⟨number⟩
⟨question name⟩ ⟶ ⟨symbol⟩
⟨answer name⟩ ⟶ ⟨symbol⟩

FIG. 7B

KEYNOTE MAP GRAMMAR

⟨map⟩ ⟶ ⟨attributes⟩⟨body⟩
⟨level⟩ ⟶ { ⟨attributes⟩⟨body⟩ }
⟨attributes⟩ ⟶ ⟨empty⟩
     | ⟨attributes⟩⟨attribute⟩
⟨attribute⟩ ⟶ /ATTRIBUTE ⟨symbol⟩⟨block⟩⟨properties⟩
⟨properties⟩ ⟶ ⟨property⟩
     | ⟨properties⟩⟨property⟩
⟨property⟩ ⟶ /PROPERTY ⟨symbol⟩⟨block⟩
⟨body⟩ ⟶ ⟨empty⟩
     | ⟨body⟩⟨assertions⟩
     | ⟨body⟩⟨keynote⟩
     | ⟨body⟩⟨level⟩
     | ⟨body⟩⟨file⟩
⟨assertions⟩ ⟶ ⟨assertion⟩
     | ⟨assertions⟩ , ⟨assertion⟩
⟨assertion⟩ ⟶ ⟨symbol⟩ = ⟨symbol⟩
     | ⟨symbol⟩
⟨keynote⟩ ⟶ /KEYNOTE ⟨symbol⟩⟨block⟩⟨answers⟩
⟨answers⟩ ⟶ ⟨empty⟩
     | ⟨answers⟩⟨answer⟩
⟨answer⟩ ⟶ ( ⟨symbol⟩⟨symbol⟩ )

FIG. 7C

ANSWER SOURCE GRAMMAR

⟨source⟩ ⟶ ⟨empty⟩
   | ⟨source⟩⟨keynote⟩
   | ⟨source⟩ , ⟨keynote⟩
   | ⟨source⟩⟨answer⟩
   | ⟨source⟩ , ⟨answer⟩
⟨keynote⟩ ⟶ ⟨symbol⟩
⟨answer⟩ ⟶ ( ⟨symbol⟩⟨symbol⟩ )

TOILET ROOM PLAN

KEYNOTE LEGEND

| | |
|---|---|
| 09300 | TILE |
| 09300.A02 | CERAMIC MOSAIC TILE, PORCELAIN, UNGLAZED |
| 09300.A04 | CERAMIC MOSAIC TILE, PORCELAIN, GLAZED |
| 09300.G01 | MARBLE THRESHOLD |
| 10160 | TOILET PARTITIONS |
| 10160.C02 | TOILET COMPARTMENT, METAL, FLOOR-ANCHORED, PORCELAIN ENAMEL FINISH |
| 10160.M02 | SCREEN, WALL-HUNG, PORCELAIN ENAMEL FINISH |
| 10800 | TOILET AND BATH ACCESSORIES |
| 10800.A03 | PAPER TOWEL DISPENSER, SUFRACE MOUNTED, STAINLESS STEEL |
| 10800.B04 | TOILET TISSUE DISPENSER, ROLL-IN-RESERVE, PARTITION MOUNTED, STAINLESS STEEL |
| 10800.Q05 | GRAB BAR, HEAVY DUTY, EXPOSED MOUNTING, STAINLESS STEEL NONSLIP TEXTURE |
| 10800.R07 | SANITARY NAPKIN VENDOR, SURFACE MOUNTED, STAINLESS STEEL, COIN OPERATED |
| 10800.S03 | SANITARY NAPKIN DISPOSAL UNIT, PARTITION MOUNTED, STAINLESS STEEL |

FIG. 8B

Control Format Output Information

ATTRIBUTE SELECTION WINDOW

DIVISION Specification Division

Level: 1   Sublevel: NO   Attributes: 1   Asserted: 0   Keynotes: 26343

FIG. 9A

Control Format Output Information

PROPERTY SELECTION WINDOW

```
  DIVISION_1  Division 1  - General Requirements
  DIVISION_2  Division 2  - Site Work
  DIVISION_3  Division 3  - Concrete
  DIVISION_4  Division 4  - Masonry
  DIVISION_5  Division 5  - Metals
  DIVISION_6  Division 6  - Wood and Plastics
  DIVISION_7  Division 7  - Thermal and Moisture Protection
  DIVISION_8  Division 8  - Doors and Windows
  DIVISION_9  Division 9  - Finishes
x DIVISION_10 Division 10 - Specialties
  DIVISION_11 Division 11 - Equipment
  DIVISION_12 Division 12 - Furnishings
  DIVISION_13 Division 13 - Special Construction
  DIVISION_14 Division 14 - Conveying Systems
  DIVISION_15 Division 15 - Mechanical
  (more)
```

Attribute: DIVISION        Property: DIVISION_10

FIG. 9B

Control Format Output Information

ATTRIBUTE SELECTION WINDOW

SCOPE    Keynote Scope
SECTION  Specification Section

Level: 2   Sublevel: NO   Attributes: 2   Asserted: 0   Keynotes: 2363

FIG. 9D

```
Control Format Output Information

P R O P E R T Y   S E L E C T I O N   W I N D O W x NARROW    Narrow Scope
  BROAD     Broad Scope Attribute: SCOPE      Property: NARROW
```

FIG. 9E

Control Format Output Information

ATTRIBUTE SELECTION WINDOW x SCOPE    Keynote Scope
  SECTION  Specification Section Level: 2   Sublevel: NO   Attributes: 2   Asserted: 1   Keynotes: 1658

FIG. 9F

```
Control Format Output Information

P R O P E R T Y   S E L E C T I O N   W I N D O W

B10100    10100 - VISUAL DISPLAY BOARDS
  x B10160    10160 - TOILET PARTITIONS
    B10200    10200 - LOUVERS AND VENTS
    B10270    10270 - ACCESS FLOORING
    B10350    10350 - FLAGPOLES
    B10416    10416 - DIRECTORIES AND BULLETIN BOARDS
    B10425    10425 - SIGNS
    B10436    10436 - EXTERIOR POST AND PANEL SIGNS
    B10500    10500 - METAL LOCKERS
    B10522    10522 - FIRE EXTINGUISHERS, CABINETS, AND ACCESSORIES
    B10550    10550 - POSTAL SPECIALTIES
    B10605    10605 - WIRE MESH PARTITIONS
    B10652    10652 - FOLDING PANEL PARTITIONS
    B10653    10653 - FIRE-RATED FOLDING PANEL PARTITIONS
    B10655    10655 - ACCORDIAN FOLDING PARTITIONS
    (more)

Attribute: SECTION      Property: B10160
```

FIG. 9G

```
Control Format Output Information

ATTRIBUTE  SELECTION  WINDOW x SCOPE     Keynote Scope
  x SECTION   Specification Section Level: 2    Sublevel: YES    Attributes: 2    Asserted: 2    Keynotes: 43
```

FIG. 9H

Control Format Output Information

ATTRIBUTE SELECTION WINDOW

| TYPE | Partition type |
| MATERIAL | Material |
| MOUNTING | Mounting style |
| FINISH | Finish |

Level: 3   Sublevel: NO   Attributes: 4   Asserted: 0   Keynotes: 43

FIG. 9I

Control Format Output Information

PROPERTY SELECTION WINDOW

COMPARTMENT Compartment
x SCREEN    Screen

Attribute: TYPE    Property: SCREEN

FIG. 9J

Control Format Output Information

ATTRIBUTE SELECTION WINDOW

```
x TYPE      Partition type
  MATERIAL  Material
  MOUNTING  Mounting style
  FINISH    Finish
```

Level: 3    Sublevel: NO    Attributes: 4    Asserted: 1    Keynotes: 19

FIG. 9K

```
Control Format Output Information

P R O P E R T Y   S E L E C T I O N   W I N D O W

POST       Floor-to-ceiling post
  OVERHEAD   Floor anchored, overhead-braced
  FLOOR      Floor-supported
  CEILING    Ceiling-hung
x WALL       Wall-supported Attribute: MOUNTING      Property: WALL
```

FIG. 9L

Control Format Output Information

A T T R I B U T E   S E L E C T I O N   W I N D O W x TYPE      Partition type
  MATERIAL  Material
x MOUNTING  Mounting style
  FINISH    Finish Level: 3    Sublevel: NO    Attributes: 4    Asserted: 2    Keynotes: 4

FIG. 9M

Control Format Output Information

K E Y N O T E   S E L E C T I O N   W I N D O W

```
  10160.M01 SCREEN, WALL-HUNG, BAKED ENAMEL FINISH
x 10160.M02 SCREEN, WALL-HUNG, PORCELAIN ENAMEL FINISH
  10160.M04 SCREEN, WALL-HUNG, STAINLESS STEEL FINISH
  10160.M05 SCREEN, WALL-HUNG, SOLID PLASTIC
```

Keynotes: 4    Required: 1    Allowed: 1    Selected: 1

FIG. 90

```
Processing Type Output Information

Select documents to process.

o L:B01010.SVM
  o L:B01095.SVM
  o L:B09300.SVM
x o L:B10160.SVM
  o L:B10800.SVM

Required: 1      Allowed: 5      Selected: 1
```

FIG. 10A

```
Processing Type Output Information

SELECT TYPE OF TOILET PARTITION TO BE USED:

o Toilet Compartments
x o Urinal Screens

Required: 1     Allowed: 2     Selected: 1
```

FIG. 10B

Processing Type Output Information

SELECT THE FINISH TYPES FOR TOILET PARTITIONS:

```
  o Metal, Baked Enamel Finish
x o Metal, Porcelain Enamel Finish
  o Metal, Stainless Steel
  o Metal, Plastic Laminate Finish
  o Solid Plastic, Homogenous Color
```

Required: 1      Allowed: 5      Selected: 1

FIG. 10C

```
Processing Type Output Information

SELECT THE MOUNTING STYLE OF SCREENS:

o Floor-Anchored
    o Ceiling-Hung
    o Floor-to-Ceiling Post
  x o Wall-Hung

Required: 1        Allowed: 4        Selected: 1
```

FIG. 10D

Processing Type Output Information

SELECT ACCEPTABLE MANUFACTURERS: (Not all produce all types or finishes. See evaluations.)

- o Accurate Partitions Div., United States Gypsum Co.
- o All American Metal Corp.
- o American Sanitary Partition Corp.
- o Ampcop Products Inc.
- x o Bobrick Washroom Equipment, Inc.
- x o Capital Partitions, Inc.
- o Columbia Partitions, Inc.
- o Flush-Metal Partitions, Inc.
- x o General Partitions Mfg. Corp.
- o Global Steel Products Corp.
- x o Knickerbocker Partition Corp.
- o Lambarton, Inc./Universal Metal Products
- o Metpar Steel Products Corp.
- x o Monarch Toilet Partitions, Inc.

(more)

Required: 1    Allowed: 17    Selected: 5

FIG. 10E

MASTER "TEXT" ELEMENT TYPES

- Index — Index document identifier.
- Basic — Basic version document identifier.
- Short_language — Short Language version document identifier.
- Copyright — Copyright.
- Spec_name — Specification name.
- Spec_date — Last update date.
- Section_number — Section number.
- Section_title — Section name.
- Part_title — Part title.

FIG. 11A-1

- `Data_sheet_title` — Data sheet title.
- `Article_title` — Article title.
- `Paragraph_n` — Paragraph at subordination $n$ where $n$ is 1, 2, 3, 4, or 5.
- `Begin_list_n` — Beginning of a list at subordination $n$ where $n$ is 1, 2, 3, 4, or 5.
- `Begin_labeled_list_n` — Beginning of a labeled list at subordination $n$ where $n$ is 1, 2, 3, 4, or 5.
- `List_element_label` — The label for an element of a labeled list.
- `List_element` — An element of a list or labeled list.
- `End_list` — The end of a list or labeled list.
- `Begin_table_n` — Beginning of a table at subordination $n$ where $n$ is 1, 2, 3, 4, or 5.
- `Begin_table_headings` — The beginning of the column headings for a table.

FIG. 11A-2

- End_table_headings — The end of the column headings for a table.
- Begin_subheadings — The beginning of a set of table column subheadings.
- End_subheadings — The end of a set of table column subheadings.
- Table_column_heading — A table column heading.
- Begin_table_entry — The beginning of a table entry, i.e., a row.
- End_table_entry — The end of a table entry.
- Table_column_entry — A table column entry.
- End_table — The end of a table.
- End_of_section — The end of a MASTERSPEC section.

FIG. 11A-3

MASTERSPEC ELEMENT GRAMMAR

⟨document⟩ ⟶ ⟨index⟩ | ⟨basic⟩ | ⟨short⟩
⟨index⟩ ⟶ Index
⟨basic⟩ ⟶ Basic Copyright Spec_name Spec_date Section_number Section_title
    ⟨part⟩⟨part⟩⟨part⟩⟨data sheets⟩ End_of_section
⟨short⟩ ⟶ Short_language Copyright Spec_name Spec_date Section_number
    Section_title ⟨articles⟩⟨data sheets⟩ End_of_section
⟨part⟩ ⟶ Part_title ⟨articles⟩
⟨data sheets⟩ ⟶ ⟨empty⟩ | ⟨data sheets⟩ Data_sheet_title ⟨articles⟩
⟨articles⟩ ⟶ ⟨empty⟩ | ⟨articles⟩⟨article⟩
⟨article⟩ ⟶ Article_title ⟨level 1⟩
⟨level 1⟩ ⟶ ⟨empty⟩
    | ⟨level 1⟩ Paragraph_1 ⟨level 2⟩
    | ⟨level 1⟩⟨list 1⟩
    | ⟨level 1⟩⟨labeled list 1⟩
    | ⟨level 1⟩⟨table 1⟩
⟨list 1⟩ ⟶ Begin_list_1 ⟨list 1 body⟩ End_list
⟨list 1 body⟩ ⟶ ⟨list 1 element⟩ | ⟨list 1 body⟩⟨list 1 element⟩
⟨list 1 element⟩ ⟶ List_element | List_element ⟨list 2⟩
⟨labeled list 1⟩ ⟶ Begin_labeled_list_1 ⟨labeled list body⟩ End_list
⟨table 1⟩ ⟶ Begin_table_1 ⟨table headings⟩⟨table entries⟩ End_table
⟨level 2⟩ ⟶ ⟨empty⟩
    | ⟨level 2⟩ Paragraph_2 ⟨level 3⟩
    | ⟨level 2⟩⟨list 2⟩
    | ⟨level 2⟩⟨labeled list 2⟩
    | ⟨level 2⟩⟨table 2⟩
⟨list 2⟩ ⟶ Begin_list_2 ⟨list 2 body⟩ End_list
⟨list 2 body⟩ ⟶ ⟨list 2 element⟩ | ⟨list 2 body⟩⟨list 2 element⟩
⟨list 2 element⟩ ⟶ List_element | List_element ⟨list 3⟩
⟨labeled list 2⟩ ⟶ Begin_labeled_list_2 ⟨labeled list body⟩ End_list
⟨table 2⟩ ⟶ Begin_table_2 ⟨table headings⟩⟨table entries⟩ End_table
⟨level 3⟩ ⟶ ⟨empty⟩
    | ⟨level 3⟩ Paragraph_3 ⟨level 4⟩
    | ⟨level 3⟩⟨list 3⟩
    | ⟨level 3⟩⟨labeled list 3⟩
    | ⟨level 3⟩⟨table 3⟩
⟨list 3⟩ ⟶ Begin_list_3 ⟨list 3 body⟩ End_list
⟨list 3 body⟩ ⟶ ⟨list 3 element⟩ | ⟨list 3 body⟩⟨list 3 element⟩
⟨list 3 element⟩ ⟶ List_element | List_element ⟨list 4⟩
⟨labeled list 3⟩ ⟶ Begin_labeled_list_3 ⟨labeled list body⟩ End_list
⟨table 3⟩ ⟶ Begin_table_3 ⟨table headings⟩⟨table entries⟩ End_table

FIG. 11B-1

MASTERSPEC ELEMENT GRAMMAR (cont'd)

⟨level 4⟩ ⟶ ⟨empty⟩
    | ⟨level 4⟩ Paragraph_4 ⟨level 5⟩
    | ⟨level 4⟩⟨list 4⟩
    | ⟨level 4⟩⟨labeled list 4⟩
    | ⟨level 4⟩⟨table 4⟩
⟨list 4⟩ ⟶ Begin_list_4 ⟨list 4 body⟩ End_list
⟨list 4 body⟩ ⟶ ⟨list 4 element⟩ | ⟨list 4 body⟩⟨list 4 element⟩
⟨list 4 element⟩ ⟶ List_element | List_element ⟨list 5⟩
⟨labeled list 4⟩ ⟶ Begin_labeled_list_4 ⟨labeled list body⟩ End_list
⟨table 4⟩ ⟶ Begin_table_4 ⟨table headings⟩⟨table entries⟩ End_table
⟨level 5⟩ ⟶ ⟨empty⟩
    | ⟨level 5⟩ Paragraph_5
    | ⟨level 5⟩⟨list 5⟩
    | ⟨level 5⟩⟨labeled list 5⟩
    | ⟨level 5⟩⟨table 5⟩
⟨list 5⟩ ⟶ Begin_list_5 ⟨list 5 body⟩ End_list
⟨list 5 body⟩ ⟶ List_element | ⟨list 5 body⟩ List_element
⟨labeled list 5⟩ ⟶ Begin_labeled_list_5 ⟨labeled list body⟩ End_list
⟨table 5⟩ ⟶ Begin_table_5 ⟨table headings⟩⟨table entries⟩ End_table
⟨labeled list body⟩ ⟶ ⟨labeled list element⟩
    | ⟨labeled list body⟩⟨labeled list element⟩
⟨labeled list element⟩ ⟶ List_element_label List_element
⟨table headings⟩ ⟶ ⟨empty⟩
    | Begin_table_headings ⟨column headings⟩ End_table_headings
⟨column headings⟩ ⟶ ⟨column heading⟩ | ⟨column headings⟩⟨column heading⟩
⟨column heading⟩ ⟶ Table_column_heading
    | Table_column_heading Begin_subheadings ⟨column headings⟩ End_subheadings
⟨table entries⟩ ⟶ ⟨empty⟩ | ⟨table entries⟩⟨table entry⟩
⟨table entry⟩ ⟶ Begin_table_entry ⟨column entries⟩ End_table_entry
⟨column entries⟩ ⟶ Table_column_entry | ⟨column entries⟩ Table_column_entry

FIG. 11B-2

MASTERSPEC STRUCTURED TEXT FILE

```
{1,/TEXT,1}       Basic            []
{2,/TEXT,1}       Copyright        [Copyright 1987, AIA]
{3,/TEXT,1}       Spec_name        [MASTERSPEC]
{4,/TEXT,1}       Spec_date        [5/87]
{5,/TEXT,1}       Section_number   [10160]
{15,/TEXT,1}      Section_title    [TOILET PARTITIONS]
{16,/TEXT,15}     Part_title       [\UGENERAL\u]
{17,/TEXT,16}     Article_title    [\URELATED\u \UDOCUMENTS\u:]
{18,/TEXT,17}     Paragraph_1      [Drawings and general provisions of
        Contract, including General and Supplementary Conditions and
        Division-1 Specification sections, apply to work of this
        section.]
{19,/TEXT,16}     Article_title    [\USUMMARY\u:]
{20,/TEXT,19}     Paragraph_1      [\UExtent\u of toilet partitions is
        indicated on drawings.]
{22,/TEXT,19 & (28 | 34)} Paragraph_1 [\UTypes\u of toilet
        compartments include:]
{23,/TEXT,22}     Paragraph_2      [Metal -- baked enamel finish.]
{24,/TEXT,22}     Paragraph_2      [Metal -- porcelain enamel finish.]
{25,/TEXT,22}     Paragraph_2      [Metal -- stainless steel.]
{26,/TEXT,22}     Paragraph_2      [Plastic laminate finish.]
{27,/TEXT,22}     Paragraph_2      [Solid plastic, homogenous color.]
{28,/TEXT,(19 & 22)} Paragraph_1   [\UStyles\u of toilet compartments
        include:]
{29,/TEXT,28}     Paragraph_2      [Floor-anchored.]
{30,/TEXT,28}     Paragraph_2      [Floor-anchored, overhead braced.]
{31,/TEXT,28}     Paragraph_2      [Ceiling-hung.]
{32,/TEXT,28}     Paragraph_2      [Floor-and-ceiling supported.]
{33,/TEXT,28}     Paragraph_2      [Wall-hung.]
{34,/TEXT,(19 & 22)} Paragraph_1   [\UStyles\u of screens include:]
{35,/TEXT,34}     Paragraph_2      [Floor-anchored.]
{36,/TEXT,34}     Paragraph_2      [Ceiling-hung.]
{37,/TEXT,34}     Paragraph_2      [Floor-to-ceiling post.]
{38,/TEXT,34}     Paragraph_2      [Wall-hung.]
{40,/TEXT,19}     Paragraph_1      [\UToilet\u \Uaccessories\u, such as
        toilet paper holders, grab bars, purse shelves, are specified
        elsewhere in Division 10.]
{41,/TEXT,16}     Article_title    [\USUBMITTALS\u:]
{42,/TEXT,41}     Paragraph_1      [\UProduct\u \UData\u\: Submit
        manufacturer's detailed technical data for materials,
        fabrication, and installation, including catalog cuts of
        anchors, hardware, fastenings, and accessories.]
```

FIG. 12A

MASTERSPEC

SECTION 10160 – TOILET PARTITIONS

PART 1 – GENERAL

RELATED DOCUMENTS:

Drawings and general provisions of Contract, including General and Supplementary Conditions and Division-1 Specification sections, apply to work of this section.

SUMMARY:

Extent of toilet partitions is indicated on drawings.

Types of toilet compartments include:

Metal – baked enamel finish.

Metal – porcelain enamel finish.

Metal – stainless steel.

Plastic laminate finish.

Solid plastic, homogenous color.

FIG. 12B-1

Styles of toilet compartments include:

Floor-anchored.

Floor-anchored, overhead braced.

Ceiling-hung.

Floor-and-ceiling supported.

Wall-hung.

Styles of screens include:

Floor-anchored.

Ceiling-hung.

Floor-to-ceiling post.

Wall-hung.

Toilet accessories, such as toilet paper holders, grab bars, purse shelves, are specified elsewhere in Division 10.

TOILET PARTITIONS

MASTERSPEC

SECTION 10160 – TOILET PARTITIONS

PART 1 – GENERAL 1.1 RELATED DOCUMENTS:

A. Drawings and general provisions of Contract, including General and Supplementary Conditions and Division-1 Specification sections, apply to work of this section.

1.2 SUMMARY:

A. Extent of toilet partitions is indicated on drawings.

B. Types of toilet compartments include:
 1. Metal – baked enamel finish.
 2. Metal – porcelain enamel finish.
 3. Metal – stainless steel.
 4. Plastic laminate finish.
 5. Solid plastic, homogenous color.

FIG. 12C-1

C. Styles of toilet compartments include:
   1. Floor-anchored.
   2. Floor-anchored, overhead braced.
   3. Ceiling-hung.
   4. Floor-and-ceiling supported.
   5. Wall-hung.

D. Styles of screens include:
   1. Floor-anchored.
   2. Ceiling-hung.
   3. Floor-to-ceiling post.
   4. Wall-hung.

E. Toilet accessories, such as toilet paper holders, grab bars, purse shelves, are specified elsewhere in Division 10.

1.3 SUBMITTALS:

A. Product Data: Submit manufacturer's detailed technical data for materials, fabrication, and installation, including catalog cuts of anchors, hardware, fastenings, and accessories.

TOILET PARTITIONS                                                          10160 – 1

FIG. 12C-2

STRUCTURED TEXT SYSTEM

BACKGROUND OF THE INVENTION

1. Field of the Invention

This invention relates to systems that utilize computers for performing operations on data obtained from a user or stored data to produce a set of printed documents which constitute a project specific specification that is coordinated with a set of drawings to produce a set of plans and specifications for an architectural or engineering project.

2. Prior Art

Recently there has been significant progress in developing tools and systems for assisting in the preparation of construction specifications. A system known as "MASTERFORMAT", is available from the Construction Specifications Institute (CSI), has been adopted as the standard for numbering specification sections and for specifying the location of trades and materials in specific sections. Further, several organizations and government agencies have provided master specification systems for the preparation of project-specific specifications. MASTERSPEC, is a system produced by the American Institute of Architects (AIA), and SPEC-TEXT, is one produced by CSI, that are perhaps the best known master and guide specifications. Also guide specifications from the Naval Facilities Engineering Command, the Army Corps of Engineers, NASA, and the Department of Veterans Affairs are available on a CD-ROM known as the Construction Criteria Base (CCB) produced by the National Institute of Building Sciences (NIBS). Which CCB materials provide government and non-government standards, codes, regulations and guidelines, that are useful for specification writers.

All of the above have been developed to assist architects, engineers, and specification writers in the preparation of construction specifications. None, however, have ensured consistency between drawings and specifications. Still missing is a linkage to ensure that what is shown in the drawings is properly defined in the specification. Traditionally, this responsibility has belonged to the specification writer, who reviews a finished, or nearly finished, set of plans and prepares a specification that is coordinated with which plans as the final project manual. This part of the process has required extensive human input and is prone to errors and omissions. The present invention recognizes this deficiency and provides a system that minimizes the chance of human error.

In recent years several design firms have made attempts at developing keynote systems for drawings to provide some linkage to the specifications. A system known as "The New System for Formatting and Integrating Construction Documentation" (ConDoc), recommends an inclusion of keynotes on drawings which reference particular specification sections. ConDoc was developed by Onkal K. (Duke) Guzey, AIA and James N. Freehof, AIA. The AIA has recently announced "ConDoc for CAD" for use with AutoCAD, and versions for other CAD systems are under development. ConDoc is a partial step towards simplifying the process of producing construction drawings. One of its features, like the present invention, is the use of keynote symbols on the drawings. The symbols refer to the text descriptions of the notes which are gathered together and placed as a unit on each sheet. Once established, each keynote remains constant for any drawing on which it appears, and for the entire set of construction drawings. ConDoc, however, while it provides a reference for developing information for inclusion in the project specification, does not also provide an editing function as does the present invention for producing finished project plans and specifications.

Heretofore a number of manufacturing systems utilizing a data base for design and analysis and as components of a process of manufacture have been developed. Some examples of such are set out in U.S. Patents to: Aish, U.S. Pat. No. 4,275,449; Durct et al, U.S. Pat. No. 4,742,464; Shebini, U.S. Pat. No. 4,859,146; Meshkat, U.S. Pat. No. 4,933,889; and Carver et al, U.S. Pat. No. 4,945,488, none of which prior patents, however, involve a data base that is referenced to a keynote system and master specification to be human interactive for producing a finished plans and specifications for construction of a project.

A computer aided drafting system is shown in a U.S. Pat. No. 4,855,993 to Fitzgerald, Jr. et al, and three dimensional depiction systems are shown in a Ockman U.S. Pat. No. 4,700,318, and in a Japanese Patent to Kogyo et al, No. 0163,665. Also, examples of human interaction interfacing systems that include data bases, but do not involve production of finished plans and specifications for construction projects are shown in U.S. Patents to: Rosenthal et al, U.S. Pat. No. 4,181,954; Shugar et al, U.S. Pat. No. 4,742,473; Ferriter et al, U.S. Pat. No. 4,862,376; and Brown et al, U.S. Pat. No. 4,939,668.

SUMMARY OF THE INVENTION

It is a principal object of the present invention to provide a structured text system that is automated for the production of finished project plans and specifications.

Another object is to provide a computer system for providing an interactive system between project drawings and a master specification with an operator selection to produce finished project plans and specifications.

Another object of the present invention is to provide, with a CAD and word processing system, a keynote system for referencing text elements of a master specification. The combination to be human interactive for producing a complete project plans and specifications.

Still another object of the present invention is to provide a computer system having both graphics and text manipulation facilities for linking project drawings with a master specification system utilizing keynotes.

Still another object of the present invention is to provide a structured text system that employs a computer system for interacting graphics and text materials with a human input for producing a finished project plans and specifications.

This invention relates to systems that utilize computers for performing operations on data obtained from a user or data stored within a system in electronic, magnetic or optical form, to produce a set of printed documents which constitute a project specific specification that is coordinated with a set of drawings to produce a set of plans and specifications for an architectural or engineering project. The structured text system performed by the invention is based on Computer Aided Design (CAD) and word processing systems for automated production of project documents. A computer system has been developed which takes advantage of the graphics and text manipulation facilities of these existing programs and links the drawings with the specifications using keynotes based on the text elements of a master specification. This system also supports traditional drawings produced by hand, which are still commonly used in conjunction with CAD drawings. While developed for use in the practice of architecture, the system is general and may be applied in other fields where a master specification must be edited to produce a project specific specification and where information used in making editing decisions can be standardized.

THE DRAWINGS

The following drawings illustrate that which is presently regarded as the best mode for carrying out the invention.

FIGS. 3A-3C show, as tables, data base relations, each table row comprising a single entry or tuple, and each column comprising a value or attribute;

FIGS. 4A-4G show data base constraints expressed in formula format;

FIGS. 5A-5H show data base editing functions expressed in formula format;

FIGS. 7A-7D show grammar formats for a computer language appropriate for use as the structured text;

FIG. 8A is a top plan schematic of a portion of a project drawing with arrows and numbers showing a number of keynote references;

FIG. 8B shows a keynote legend for the keynote references set out in FIG. 8A;

FIG. 10A shows a typical first question of a series of questions for interaction with a human editor;

FIGS. 10B-10E show subsequent questions to the first question of FIG. 10A, based on a section of the master specification;

FIGS. 11A-11B show examples of a language used for the master specification documents; and FIGS. 12A-12C show a portion of a master specification section in its structured text form.

DETAILED DESCRIPTION

Master Specification and Keynote List Overview

Figure 1:
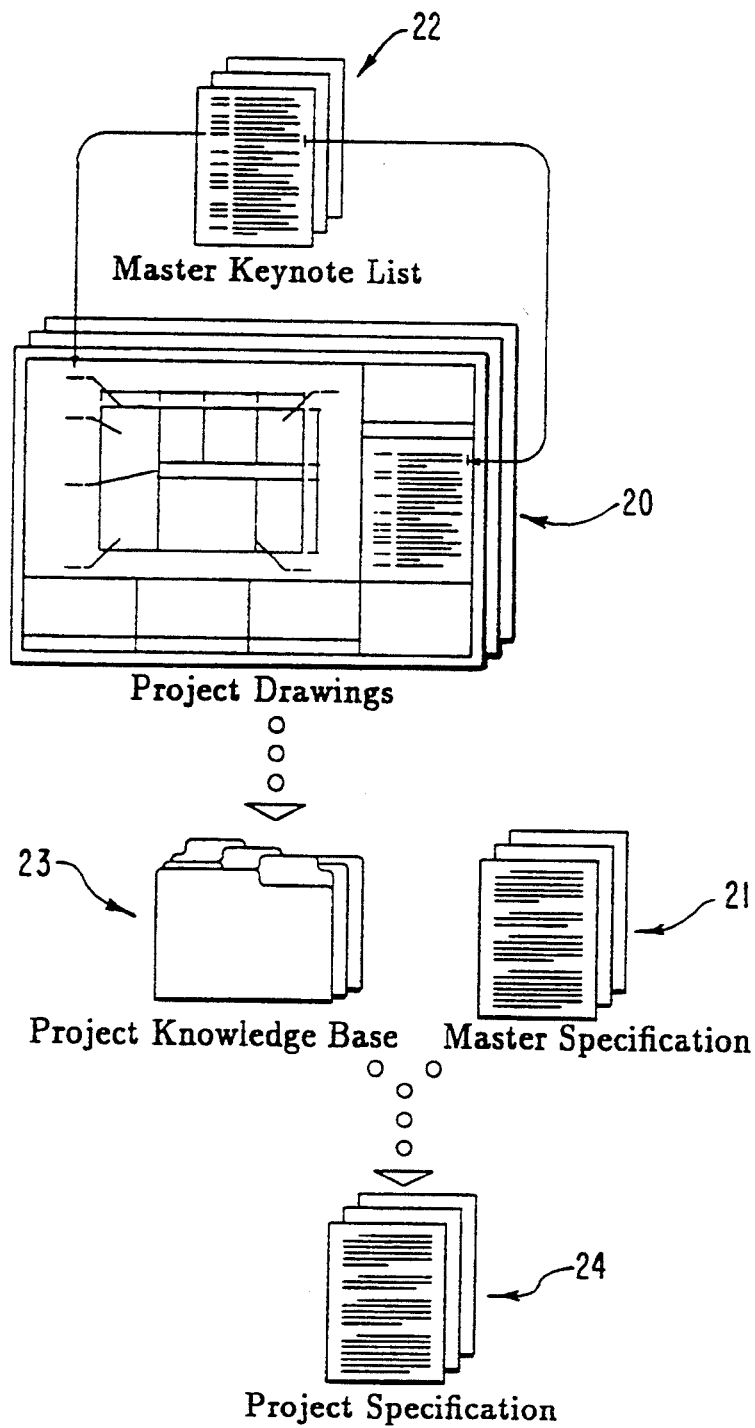
FIG. 1 is a block flow schematic showing the component elements of the structured text system of the present invention.

The present system set out in FIG. 1 incorporates a master specification 21 that can be the MASTERSPEC or SPECTEXT systems, as identified in the prior art, or other systems within the scope of this disclosure. The master specification is an integral data base component, with an ordered list of text elements, such as titles, paragraphs arranged in levels of subordination, lists and tables, and the like. In addition to their sequence on the printed page, the elements are otherwise related, for example, they are subordinated to one another. A typical master specification section consists of a hierarchy of elements beginning with the section title. Immediately subordinate thereto are three parts and the end-of-section banner. Each part consists of a title (for example, GENERAL, PRODUCTS, and EXECUTION) and a set of subordinate articles which subordinate articles themselves consist of a title and a set of paragraphs. These paragraphs are further organized into various subordination levels with a set of paragraphs at one level being subordinate to a paragraph at the next higher level. In addition to paragraphs, articles may also include lists, tables, and schedules, which themselves comprise entries or rows and have still finer subordinate structures.

The subordination structure of a master specification 21 section, unlike a presentation order of the elements, is not linear. It forms a "tree" where elements with the same level of subordination, such as part titles, are physically separated from each other on the printed page by other elements. The relationship between the subordination structure and the presentation structure is not arbitrary, but rather is based on an algorithm for the conversion of the subordination "tree" structure to and from the linear presentation order. This conversion from the tree structure to the linear order is straightforward. However, a reader's or operator's conversion in the other direction is not, and accordingly various hints are provided in the master specification itself. For example, the paragraph numbered version of the master specification uses a numbering scheme and indentation to indicate a section's subordination structure. Whereas, a block format version relies on a more subtle scheme of capitalization, underlining, and indentation. Regardless of format, the subordination structure of the section is the same, and its correct interpretation is important to the understanding of its information.

Other relationships between the elements of a master specification section are less formally indicated. These relationships have little or no resemblance to the presentation order or the subordination structure. The information presented in a section can be organized in several different ways. A three-part format is preferred for use in specification sections, but other organization schemes can be utilized. For example, a section could be a series of complete descriptions of products and related applications, organized by individual manufacturers. While such an organization is not as universally applicable as the preferred three-part format, it illustrates another logical view of the information in a section. Regardless of which organization format is employed in a given section, a computerized data base for that section can include the additional organization schemes. The system software is constructed to be able to use different format schemes so as to edit consistently a master section for a specific project, shown as project specification 24.

When a master specification section 21 is edited for a specific project, that edit can be thought of as happening in two passes. The first pass removes all elements of the master specification which do not apply to the project. The second pass adds information which is unique to the project and not covered in the master specification, and further modifies information in that master specification to meet the specific needs of the project. To perform these passes, a knowledge base 23 is required which represents the salient characteristics of the project. In the conventional process, this knowledge base exists in the mind of the operator or writer, for example, the architect, engineer or specification writer. The knowledge base is acquired by means of human communication and is augmented by the human ability to reason, extrapolate, infer new facts from available information, and to remember and learn from experience.

The first pass of the edit process can easily be performed by examining each element of the master specification 21, consulting the knowledge base 23, and determining if it applies to the specific project. The second pass is not as easy. It requires more complex reasoning to determine which aspects of the project, not covered in the master specification, need to be added to the section. This is based on experience of the operators and their understanding of what does and does not constitute common knowledge and practice.

A simple example of the editing process is the selection from a list of manufacturers who are identified as competent to be bid for a specific product. The master specification may include a list of such manufacturers, with the operator or writer to interact with the data to remove those manufacturers as they determine are not acceptable, which removal is made during the first pass, with any acceptable local or regional manufacturers as they select can be added during the second pass.

The two editing passes differ greatly in the extent of the knowledge base which must be consulted. The scope and nature of the knowledge required for the second pass is not easily defined or quantified. Whereas, the scope and nature of the information needed for the first pass is all found in the master specification 21. Accordingly, the master specification represents a fixed, finite data base which implies a finite limit to the size and nature of the knowledge base required for the edit, and lends itself to automation using computer technology.

A project knowledge base 23 suitable for the first pass of the editing process can consist of a set of answers to questions derived from the master specification 21. The set of questions is finite and fixed for a given section and represents all of the knowledge required to determine whether or not each text element of the section is required for the project. To edit a section, a computer program is preferably utilized to produce the answers to the questions associated with the section. Such program can ask the writer directly, or can both utilize other sources and only ask the writer for information not present in such sources.

An obvious source of information is the project drawings 20. However, such drawings as are produced with pencil and paper or even a CAD system are difficult for a machine to interpret. Which difficulty the present system addresses utilizing other information in the drawings for aiding the contractor in bidding and construction. In the present system, information in the form of notes is included on project drawings 20 for use in conjunction with the knowledge base to edit the specifications. Which information in notes as is useful for automated editing is also amendable to standardization, such as in the standardized keynotes of the present invention, for simplifying the process of interpretation.

Standard keynotes are produced in the present system for each section as a part of the production of the master specification 21. These keynotes are then referenced in the drawings as standard keynotes in place of the usual ad hoc notes typically found in current practice. The presence of a given keynote implies the answer, or partial answer, to one or more of the questions asked during the automated editing process. The complete set of keynotes on all drawings for a project is contained in a master keynote list 22 that provides a substantial portion of the knowledge base 23 needed for the above described first pass of the editing process. Additional information can then be obtained from the writer, who can review and amend the information obtained from the keynotes. Additional sources of information can also be used to augment the project knowledge base in the editing process. Standardized details, as may also contain the standard keynotes of the present system, standard symbols, material attributes, product information, and other types of information on the drawings or in data bases can further be used to provide additional editing guidance.

In practice, the standardized keynotes from the master keynote list 22 which the notes on the drawings are selected from are closely coordinated with the master specification 21. The note numbers and the section numbers must therefore also be coordinated. For example, a note might indicate a particular part, its mounting, material, type, and finish. All of this information must be coordinated with the appropriate section of the specification.

A complete set of standardized keynotes or master keynote list 22 for a master specification 21 may contain as many as 20,000 notes. Selecting the proper note for use on a drawing, whether on paper or in a computer, could therefore be a formidable task. This task is manageable in the present invention that utilizes software that includes a query capability to search the list of keynotes with desired attributes for a specific note. In the present system this facility is accessible to the CAD operator or traditional draftsman during the drawing formulation process.

The architect, engineer, or specification writer has the opportunity to do the final edit and make the final decisions about which text to remove and which text to add to the master specification 21. This is possible when the automatically edited specification sections are available in word processing formats. Portions of text to be deleted are shown struck out, with the writer having the opportunity to review decisions that have been made during the automatic editing process. The writer then makes the final decision as whether to remove a particular section of the text. The writer can also augment a section with additional text. This final edit thus forms the second pass of the complete editing process as set out earlier herein.

The concurrent development of the project specifications 24 and drawings 20 is supported by including keynotes of varying scope in the master keynote list 22. Thus, during schematic development, a single broad-scope keynote on a drawing might indicate that toilet partitions are required. For the present system, as set out in FIGS. 8A and 8B, this is shown as Section 10160 in the project specifications. As shown, in working drawings for this feature, narrowscope keynotes with more detail would indicate material, mounting, and finish of toilet partitions are used. This detailed information results in the removal of all other partition configurations from the master section.

Summarizing, design changes are reflected in the drawings and their associated keynotes. For example, if the toilet partition style were changed from floor-supported to floor-supported, overhead-braced, only the keynote reference number would need to be changed. These changes can be incorporated into the project knowledge base 23, and the master specification 21 sections can be re-edited accordingly. Information solicited from the writer during previous sessions is also maintained in the knowledge base 23 and may be reviewed and revised, thus facilitating the re-edit process.

Conceptual Description

The present invention hereinbelow is described in a conceptual form, depicted in computer system 25 of FIG. 2. Computer system 25 consists of a stored program computer 26, that is for running programs that describe actions to be performed for carrying out systems programs utilizing a data base that includes a display output terminal 27 that includes a manual input keyboard, one or more mass storage devices 28, shown as hard disk, floppy diskette and CD ROM, that are long term read/write storage and optional read-only storage elements of which at least one supports both read and write operations, and a printer 29 as a hardcopy output arrangement. In addition, one or more of the mass storage devices 28, from which data may be read, preferably contains information in the form of a data base. Which data base, among other things, represents the master specification, shown at 21 in FIG. 1, from which project specific specifications 24 are derived. Some or all of this data base is contained on one of the mass storage devices 28 of FIG. 2, to which data may also be written and some or all of this portion of the data base constitutes the project knowledge base 23 of FIG. 1, which describes one or more projects for which project specific 24 specifications are produced.

Figure 2:
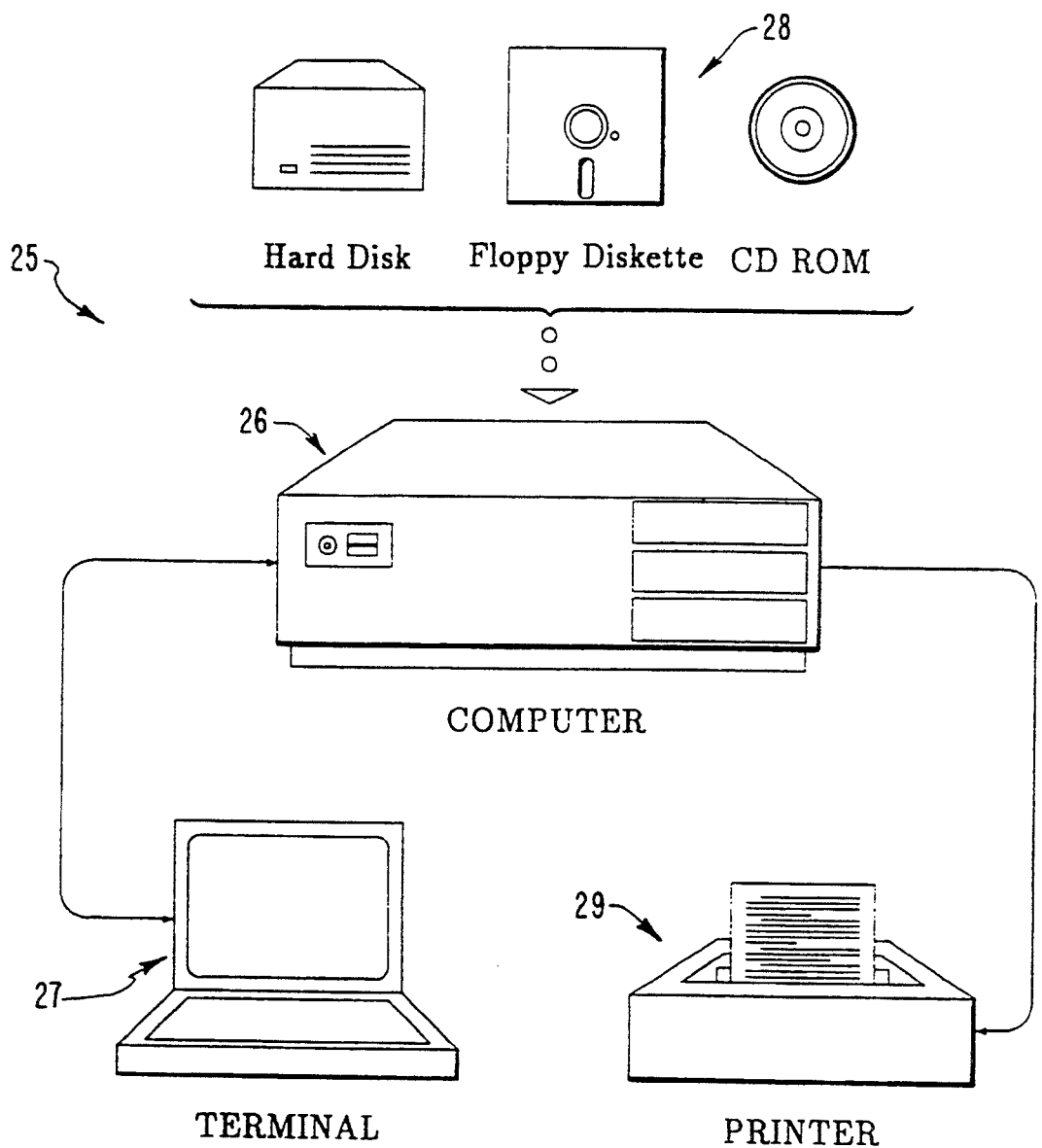
FIG. 2 is a schematic view of interactive components of a computer system utilized in the present invention.

One or more of the mass storage devices 28 of FIG. 2 also contain a list of instructions which the computer 26 copies into its main memory and executes. The execution of these instructions results in the computer requesting and obtaining various pieces of information from the user, via the terminal 27, modifying the information in the project knowledge base 23 portion of the data base, and generating the project specific specification 24 documents in hardcopy form, via the printer 29.

The following discussion centers on the nature of the data base required for the system of the present invention, the discussion utilizes a relational model, and sets out the operations which the computer of which system must perform in order to produce the project specific specification 24 of FIG. 1, from which data base. The process of obtaining and modifying the project knowledge base 23 portion of the data base is set out later herein in an example discussing a toilet room plan 60, as shown and discussed with respect to FIGS. 8A and 8B. Further, the process of formatting and writing the resultant project specification 24 of FIG. 1, for printing by the printer 29 of FIG. 2 is deferred to the discussion of which toilet room plan 60 example of the present invention. Thus, for the following discussion, the data base is assumed to contain all of the relevant project knowledge base 23 information, and the resultant project specification 24 is assumed to consist of a set of documents which are the only documents of the master specification 21 which are known to be required in the resultant project specification 24. Further, each document consists of the ordered linear sub-list of textual elements of the document which is known to be the only portion of the document which is required for the resultant project specification 24.

Data Base Formulation

The data base consists of a set of relations that are broadly presented in FIGS. 3A-3C, in diagramtic form as tables. Each relation may be viewed as a two-dimensional table of rows and columns. Each row comprises a single entry (a tuple) consisting of one value for each column (an attribute). The diagram for each relation may be interpreted as a schematic representation of a single tuple of the associated relation or, alternatively, as the headings for the columns of the table. Thus, each relation is a named set of tuples. The relation name appears above the diagram for the particular relation. Each tuple in a relation contains an ordered vector of values corresponding to the attributes denoted by the boxes in the diagram for the particular relation. An attribute of a relation will be denoted by the attribute name prefixed with the relation name. For example, the first attribute of the first relation in FIG. 3A is denoted as ELEMENT.Doc.

One or more of the attributes of each relation form the key for the relation, that is, the values of the key attributes as uniquely identify a tuple in the relation. The key attributes are located at the left edge of the diagram in bold type. For example, the key for the ELEMENT relation in FIG. 3A is the concatenation of the attributes ELEMENT.Doc and ELEMENT.ID. Thus, for the example of FIGS. 8A and 8B, as set out herein below, there may be any number of tuples in the ELEMENT relation with the attribute ELEMENT.Doc of "B10160" or the attribute ELEMENT.1D of 1, but there may be at most one tuple with both ELEMENT.Doc of "B10160" and ELEMENT.ID of 1.

In addition to the relations, which constitute the representation of the data base, a set of constraints are given in FIGS. 4A-4G. Each constraint is presented as a formula which evaluates to "true" or "false" for a given instance of the data base. For an instance where the data base is to be considered valid, all of the formulas must be "true" simultaneously. Taken as a whole, the conjunction of the constraint formulas forms a representation invariant for the data base. The notational conventions used in these formulas are summarized in FIG. 4A. References to these formulas will be made in the following discussion with reference to the associated number to the left of each formula.

Document Structure

The master specification 21 of FIG. 1 from which project specific specifications are derived consists of a set of documents or sections. These are represented in the data base by the relations in FIG. 3A. Each document consists of a set of elements represented by the tuples in the relation ELEMENT which have the same value for the attribute ELEMENT.Doc. Each tuple in this set is further identified by the value for the attribute ELEMENT.ID. This number not only distinguishes one element of a document from another, it also indicates the relative order of the elements of the document as indicated by the "first" and "next" functions set out in FIG. 5F, discussed hereinbelow.

As indicated by Formula (1) of FIG. 4B, each element has a support expression constructed from tuples in the NODE and ARGUMENT relations starting with the tuple in NODE referenced by ELEMENT.Node. The expression takes the form of a directed acyclic graph (DAG) as indicated by Formulas 8 and 9 of FIG. 4E. Each node represents a logical operation indicated by the attribute NODE.Type which is "And", "Or", or "Not". The arguments of the operation are indicated by the attributes NODE.Arg1 and NODE.Arg2 which are both references to tuples in the relation ARGUMENT. For the "Not" operation, NODE.Arg1 is not used. The arguments are of type "Node" or "Ref" as indicated by the attribute ARGUMENT.Type. For a "Node" type argument, ARGUMENT.Object is a reference to a tuple in the NODE relation. For a "Ref" argument, ARGUMENT.Object corresponds to the ELEMENT.ID attribute of some tuple in the ELEMENT relation whose ELEMENT.Doc attribute matches the ELEMENT.Doc attribute of the element in which this argument occurs. The semantics of a support expression are given by the function "support" in FIG. 5E.

Formula (1) of FIG. 4B also specifies that each element of a document has an associated type indicated by the attribute ELEMENT.Type which is either "Text", "Control", or "Question". The value of the attribute ELEMENT.Data refers to a tuple in the TEXT, CONTROL, or QUESTION relation, depending on the element type. These tuples contain the detailed description of the corresponding types of elements.

The "Text" type elements contain the actual text which is part of the document represented by the elements. This text is the value of the TEXT.Text attribute of the tuple. This text contains no formatting information (for example, no line breaks, tabs, multiple spaces, or other alignment mechanisms), but may contain character rendering information (for example, underlining, bolding, superscripts, subscripts, etc.). The TEXT.Symbol attribute of the tuple indicates the part of the document which the element represents (for example, section title, paragraph, subparagraph, etc.). These symbols imply how the element is to be formatted in the final document.

The "Control" type elements contain an ordered sequence of zero or more commands indicated by the value of the attribute CONTROL.Cmd which, if non-zero, refers to a tuple in the COMMAND relation. This tuple, if any, is the head of a non-recursive linked list formed from other tuples in the COMMAND relation as indicated in Formula (5) of FIG. 4D. The attribute COMMAND.Next of each tuple acts as the link to the next tuple in the list with a zero value for this attribute indicating the end of the list. The attribute COMMAND.Type indicates the type of the command (for example, "If", "Answer", "Require", or "Delete") and the attribute COMMAND.Data refers to a tuple in one of the other relations (for example, IF, ANSWER, REQUIRE, or DELETE, respectively) which specifies the details for the command.

The semantics of a command sequence are given by the function "exs" shown in FIG. 5D. Briefly, the "If" command specifies a selection between the two sequences of zero or more commands indicated by the attributes IF.Cmd1 and IF.Cmd2 in a manner similar to CONTROL.Cmd. The selection is based on the support expression indicated by the attribute IF.Node similar to that described above for ELEMENT.Node. The "Answer" command specifies the assertion of the answer named by the attribute ANSWER.Ans to the question named by ANSWER.Ques. The "Require" command specifies that the document named by the attribute REQUIRE.Doc is a required part of the project specification. The "Delete" command specifies that the element, if any, whose attribute ELEMENT.ID matches the attribute DELETE.Elem and whose attribute ELEMENT.Doc matches the ELEMENT.Doc attribute of the element in which this command occurs is to be deleted from the project specification.

The "Question" type elements describe multiple choice questions the semantics of which are given by the function "exq" in FIG. 5C. The attribute QUESTION.Symbol is the name of the question and the attribute QUESTION.Text is the text of the question. The attribute QUESTION.Require specifies how many of the alternative answers to the question must be selected before the question is considered to be satisfactorily answered, and the attribute QUESTION.Allow specifies the maximum number of the alternative answers which may be specified for a satisfactorily answered question. The list of alternative answers for the question is indicated by the attribute QUESTION.Alt which specifies the head of a non-recursive linked list of tuples in the ALTERNATIVE relation as indicated by Formula 4 in FIG. 4C. Each tuple of this relation describes a single alternative. The attribute ALTERNATIVE.Next, if non-zero, indicates the next alternative on the list. The last alternative has ALTERNATIVE.Next set to zero. The semantics of an alternative are given by the function "exa" in FIG. 5C. Each alternative has a name specified by the attribute ALTERNATIVE.Symbol and a text description specified by the attribute ALTERNATIVE.Text. The presence or absence of an alternative for a satisfactorily answered question has a sequence of zero or more commands associated with it. The sequences are indicated by the attributes ALTERNATIVE.Cmd1 and ALTERNATIVE.Cmd2, respectively. The validity of the alternative is conditional upon the support expression indicated by the attribute ALTERNATIVE.Node.

Keynote Map Structure

The relations set out in FIG. 3B constitute the keynote map or list 22 of FIG. 1 used primarily for converting a keynote reference to a set of answers to questions. This is accomplished with the MAP relation. Each tuple of the relation describes a single answer, MAP.Ans, to a single question, MAP.Ques, which is asserted if the keynote MAP.Note is referenced in the project knowledge base.

The remainder of the keynote map relations are used for various secondary functions. Each tuple in the NOTE relation defines one of the standardized keynotes. The attribute NOTE.Label is the label by which the keynote is referenced and the attribute NOTE.Desc is the text description of the note itself. Associated with each keynote is a set of "attributes", not to be confused with attributes of the relations, which characterize the note. Each of these attributes may take on one of a finite set of values referred to as "properties". The attributes are arranged in a tree structure of "levels" described by the tuples of the LEVEL relation as indicated by Formula 10 of FIG. 4F. Each level in the tree structure is described by a tuple in the relation LEVEL. For each tuple, the attribute LEVEL.ID is an identifier for the level and the attribute LEVEL.Parent is the level identifier of the single parent level. LEVEL.Parent is zero for the root level. Each level has a set of zero or more attributes defined for it. Each of these attributes is described by a tuple in the ATTRIBUTE relation. The attribute ATTRIBUTE.Level is the identifier of the level to which the attribute belongs. ATTRIBUTE.Label is a label by which the attribute may be referenced and ATTRIBUTE.Desc is a text description of the attribute. Each attribute has a set of associated properties described by tuples in the PROPERTY relation. PROPERTY.Level and PROPERTY.Attr are the level identifier and attribute label, respectively, of the attribute to which the property belongs. PROPERTY.Label is a label by which the property may be referenced and PROPERTY.Desc is a text description of the property. Each sublevel of a parent level is identified by a unique set of properties for a subset of the attributes of the parent level. These key sets are defined by the tuples of the LEVELCHAR relation. Each tuple describes a single property of a single key set where LEVELCHAR.Level is the identifier of the sublevel for which the key set applies. LEVELCHAR.Prop is the label of the property which is one of the properties defined for the attribute named by LEVELCHAR.Attr which is an attribute defined for the parent level. The tuples of the relation NOTECHAR define the properties which characterize the various notes. Each tuple associates a single property indicated by the attribute NOTECHAR.Prop, which is one of the properties defined for the attribute NOTECHAR.Attr of level NOTECHAR.Level, with the note referenced by NOTECHAR.Note.

Knowledge Base Structure

The relations set out in FIG. 3C constitute the project knowledge base 23 of FIG. 1 which forms the primary input for the editing operation discussed below. The relation KEYNOTES corresponds to information obtained from external sources such as the drawings 20 of FIG. 1. Each tuple represents a reference to the keynote identified by KEYNOTES.Note for the project named by KEYNOTES.Proj. The attribute KEYNOTES.Src is the name of the source of the reference, such as a drawing or file name. It is used to aid updating operations which will be described later herein.

The relation ANSWERS corresponds to information obtained in the form of specific answers to specific questions. Such information may be obtained from the same sources as the keynotes contained in the KEYNOTES relation, but typically is obtained from the operator or user directly. Thus, the relation can be viewed as a model for all of the information which comes directly from the user. The attributes ANSWERS.Proj and ANSWERS.Src are similar to the same attributes in the KEYNOTES relation. The attributes ANSWERS.Ques and ANSWERS.Ans are the labels of a question and one of its alternatives, respectively.

The information contained in the two relations can be combined into a single set of question and answer pairs which constitute a project knowledge base by the function "kb" shown in FIG. 5H.

Operations

The production of a project specification 24 of FIG. 1 from a master specification 21, represented by the data base described above, can be viewed as the evaluation of a function which acts upon the information contained in the data base and a finite number of externally supplied parameters. It should be understood that the evaluation of such a function is equivalent to the execution of a set of instructions by a computer which performs the process described by the function's definition. Indeed, computer programming languages such as LISP and ML are based upon the definition of executable programs as functions.

FIGS. 5A–5F define a set of functions which together constitute the editing function. The primary editing function is "prjspc" in FIG. 5A. The following discussion contains descriptions of each function. To facilitate understanding of the editing process, the functions will be described in a bottom up order.

1. Document Traversal

The processing of the elements of a document in a master specification is performed in ascending order based on the values of the ELEMENT.ID attribute of the tuples which represent the elements of the document. The functions in FIG. 5F support this ordered traversal of a document. The function "first", given a document name, returns ELEMENT.ID for the first element of the document, if there is such an element, and 0 if the document does not exist, that is, there are no tuples with a value for ELEMENT.Doc that matches the named document. The function "next", given a document name and an element identifier, returns ELEMENT.ID for the element of the named document which follows the specified element, or zero if the specified element is the last element of the document.

2. Support Expression Evaluation

The interrelationship of the elements of a document is represented by the support expressions defined by the tuples in the relations NODE and ARGUMENT. The functions in FIG. 5E evaluate a support expression. The function "support" takes a document name, a node identifier, and a set of document name and element identifier pairs, respectively. The set of pairs constitute a list of elements of the master specification which are not to appear in the project specification. The function returns "true" if there is no tuple with NODE.ID that matches the specified node identifier, that is, the specified node identifier is 0. Thus, the absence of a support expression is equivalent to unconditional support. If the node identifier is non-zero, one of the other cases indicated by the function will apply where the arguments are evaluated and the appropriate operation is performed to yield the returned result.

The function "suparg" evaluates an argument of a node in a support expression given the name of the document in which the expression occurs, the identifier of the argument, and the set of deleted elements. The function returns "false" if the argument is a reference to an element (that is, ARGUMENT.Type is "Ref") which is deleted (that is, is present in the set of deleted elements). If the referenced element is not deleted, its support expression is evaluated and returned as the function value. If the argument is a reference to a node (that is, ARGUMENT.Type is "Node"), the support expression beginning with the indicated node is evaluated and returned as the function value.

3. Command Execution

The actual editing of the master specification is performed by the commands described by the tuples in the COMMAND, IF, ANSWER, REQUIRE, and DELETE relations. The functions in FIG. 5D execute these commands. The function "exs" executes a sequence of commands, in order. The function takes the name of the document which contains the sequence, the identifier of the first command of the sequence, a set of question and answer pairs, a set of names of documents yet to be processed, a set of names of documents which have been processed, and a set of deleted elements, respectively. The function returns the four sets, unaltered, if the command identifier is zero. Otherwise, the command described by the indicated tuple in the COMMAND relation is executed to yield new versions of the four supplied sets. These sets are then used to execute the remainder of the command sequence, the results of which are returned as the function value.

The function "exc" executes a single command and takes the same parameters as "exs". The result of the execution is a collection of four sets which correspond to the four supplied sets, with appropriate modifications based on the type of the command. If the command is a conditional (that is, COMMAND.Type is "If"), the support expression is evaluated using the supplied set of deleted elements, the appropriate sequence of commands is executed and the resultant sets returned. If the command is an answer to a question (that is, COMMAND.Type is "Answer"), the answer is asserted by the function "assert", described below, which yields an updated version of the answer, required document, and completed document sets. If the command is a required document (that is, COMMAND.Type is "Require"), the indicated document is added to the required document set if it has not already been processed (that is, is not a member of the completed document set). If the command is an element deletion (that is, COMMAND.Type is "Delete"), the indicated element is added to the set of deleted elements.

The function "assert" performs the assertion of an answer to a question. The function takes the names of the question and answer, and the sets of answers, required documents, and completed documents. If the indicated answer already exists in the supplied set of answers, the three sets are returned unaltered. Otherwise, the answer is added to the set of answers and any documents in the set of completed documents which contain the named question are removed from the completed document set and added to the required document set so that they may be reprocessed with the new information.

The function "has", given the name of a question, returns a set of names of documents which contain the named question.

4. Element Processing

The functions in FIG. 5C execute a single element of a document. The function "exr" executes a control element, that is, ELEMENT.Type is "Control". The function takes the name of the document which contains the element, the identifier of the tuple in the CONTROL relation which describes the element, and the same collection of four sets accepted by "exs" described above. The function simply executes the sequence of commands indicated by the attribute CONTROL.Cmd and returns the resultant collection of sets.

The function "exq" executes a question element, that is, ELEMENT.Type is "Question". The function takes the name of the document which contains the element, the identifier of the tuple in the QUESTION relation which describes the element, and the same collection of four sets accepted by "exr". If the question is adequately answered, the function executes the list of alternatives as described below, and returns the resultant collection of sets.

The function "answered" determines whether or not a question is adequately answered. The function takes the name of the document which contains the question, the identifier of the tuple in the QUESTION relation, and the answer and deleted element sets as described above. The question is considered adequately answered if the number of alternatives to the question which are supported and selected is at least as many as are required for the question (that is, QUESTION.Require) and are no more than the that allowed (that is, QUESTION.Allow). The function "anscnt" performs the actual count of the number of supported and selected alternatives. It takes the document name, the identifier of the first alternative of the list of alternatives to be examined, the name of the question, and the answer and deleted element sets. If the alternative identifier is 0, the list is empty and the returned count is 0. Otherwise, the support expression for the alternative is evaluated and if supported, the alternative symbol (that is, ALTERNATIVE.Symbol), along with the supplied question name are looked up in the answer set. If found, the alternative is counted. In either case, the remainder of the list is examined.

The function "exl" executes a list of alternatives for a question. The function takes the document name, the identifer of the first alternative, the question name, and the collection of four sets. If the list is empty (that is, the alternative identifier is 0) the collection of sets is returned unaltered. Otherwise, the alternative is executed and the remainder of the list is executed using the resultant collection of sets.

The function "exa" executes a single alternative. It takes the same information as "exl" but only considers the actual alternative indicated and not any subsequent alternatives on the list. The alternative is first checked to see if it is supported, and if so, one of the two lists of commands for the alternative (that is, ALTERNATIVE.Cmd1 or ALTERNATIVE.Cmd2) is executed and the resultant collection of sets is returned. The determination of which sequence of commands to execute is based on the presence or absence of the alternative in the set of answers.

5. Project Processing

The high level processing of the documents and the elements they contain is performed by the functions in FIG. 5B. The function "prp" processes the entire project. It takes the same collection of sets described earlier. The set of answers constitutes the knowledge base for the project. The required document set acts as the source of processing yet to be performed. The completed document and deleted element sets are the major results of the processing and essentially constitute the edited specification. The function selects one of the documents yet to be processed, moves it to the completed document set and then processes it. This is repeated until no documents remain to be processed.

The function "prd" processes a single document and takes the document name and the collection of four sets. Any elements of the named document are first removed from the set of deleted elements. The question elements of the document are then processed, followed by the control elements. The updated collection of sets is returned as the function value.

The function "prq" processes the question elements of a document. The function takes the name of the document, an element identifier, and the collection of four sets. The element identifer indicates which element of the document is to be examined next. If the element is not deleted, is supported and is a question, it is executed. Otherwise, the element is skipped. In either case, the next element is processed in a similar fashion until the entire document has been processed. The function "prc" is analogous to "prq", but operates on control elements.

6. Specification Design

The complete production of the project specification is performed by the functions in FIG. 5A. The completed project specification takes the form of a set of files returned by the function "prjspc" which takes a project name and a single document name as input. The supplied document is assumed to contain commands which cause additional documents to be processed in order to form the complete specification. This first document is called the index document and typically contains a single question element whose alternatives "require" the inclusion of the other major documents of the specification. The function first edits the master specification (that is, constructs the completed document and deleted element sets) and then outputs the edited specification to a set of files, one file for each completed document.

The editing of the master specification is performed by the function "edit" which takes the same parameters as "prjspc". The function forms the initial collection of four sets which constitute the environment in which the editing process will proceed. The answer set is produced from the project knowledge base in the ANSWERS and KEYNOTES relations by the function "kb" in FIG. 5H. The required document set is constructed from the single supplied document name. The completed document and deleted element sets are both initially empty. The returned function value is a pair consisting of the completed document and deleted element sets resulting from the "prp" function.

Each document of the edited specification is output by the function "outdoc" which takes the name of a document and the deleted element set and yields the file to which the document was written. The file is first opened and then each text element (that is, ELEMENT.Type is "Text") is written to the file. The file is then closed. The function "outelem" takes a file, a document name, an element identifier and the deleted element set and yields an updated file. The updated file contains the indicated element of the named document if it is a text element which is not deleted and is supported. Any other elements of the same document which follow the indicated element are also appended to the file. The functions "open", "write", and "close", not defined here, open a file for a document, write a text element to a file, and close a file, respectively. All three functions return a file. In the case of "open" the file is empty. For "write" the returned file consists of the supplied file (that is, the first parameter) with the text element (that is, the second parameter) appended to it. The function "close" returns the closed form of the supplied file.

7. Keynote Referencing

The keynote map relations, in addition to being used to translate keynote references to question and answer pairs, are useful in selecting a desired note through the specification of properties embodied in the note. FIG. 5G describes a set of functions which are useful for this purpose. The function "sub" is useful for navigating through the tree structure of levels. The function takes a level identifier and a set of properties (that is, triples consisting of a level identifier, attribute name, and property name). It yields the identifier of the sublevel whose key set is contained in the supplied property set. If none of the key sets of the sublevels of the indicated level is contained in the property set, the returned function value is 0.

The function "attrs" given an identifier for a level, returns the set of names of all of the attributes defined for the level. Similarly, the function "props", given a level and an attribute name, returns the set of property names defined for the named attribute of the indicated level.

The function "notes", given a set of properties, returns the set of names of the notes which are characterized by the properties contained in the set, that is, the set of names of the notes which have all of the properties contained in the supplied set. The set is constructed as the intersection of the complete set of notes in the data base and the sets of notes which possess each individual property in the supplied property set. The function "pnotes", given a single property in the form of a level identification, attribute name, and property name, returns the subset of notes in the data base which possess that property.

8. Project

The function "kb" in FIG. 5H constructs the knowledge base for a project, in the form of a set of question and answer pairs, given the name of the desired project. The set consists of all of the pairs directly derivable from the ANSWERS relation and all of the pairs indirectly derivable from the KEYNOTES relation using the MAP relation to translate the keynote names to question and answer pairs.

The Invention

The following illustrates a utilization of the present invention as it applies to the production of architectural and engineering specifications from a master specification. It should be understood, however, that the invention is applicable to other activities.

For this example, an Intel 80386 micro-processor based personal computer is selected as the computer 26 of FIG. 2, with a monitor, keyboard, and mouse, as the terminal 27, with a printer 29, and a hard disk drive as the storage devices 28. The computer 26, for this embodiment is set up to run the MS-DOS operating system written by Microsoft, Inc. It should be understood, however, that any other general stored-program computer with appropriate peripheral equipment either directly connected or accessible by other means (for example, over a network) may be used as the active element of the invention. It should be further understood that other operating systems may be used to provide basic functional support of the computer hardware, within the scope of this disclosure.

In the preceding conceptual discussion, the data base was presented as a single relational data base. In the preferred embodiment, it is broken into three separate data bases roughly along the lines indicated by FIGS. 3A through 3C. Furthermore, the data base is not implemented in the relational model, but rather as a collection of data structures contained in various files stored on the hard disk drive. This organization provides for ease of use and efficient performance of the various operations, as described earlier herein.

The instructions which the computer system 25 executes are organized into several programs, some of which are available commercially. However, certain programs that are currently available are appropriate to provide a set of instructions as is required to direct the computer to perform the operations of the invention. These programs are written in the C programming language. However, it is understood that they could be written in other programming languages such as LISP, ML, PROLOG, PASCAL, FORTRAN, or the like.

Figure 6A:
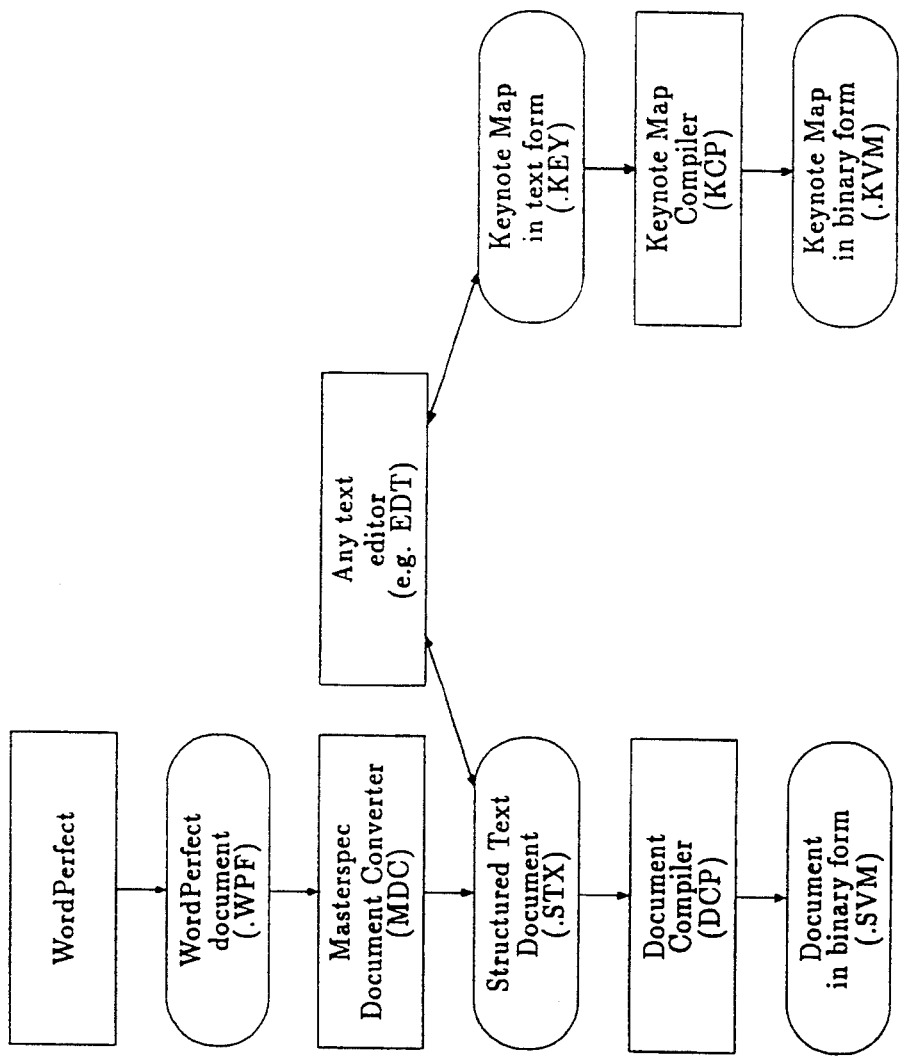
FIGS. 6A-6C show block flow schematic representations of the relationship between system programs and the data base.
Figure 6B:
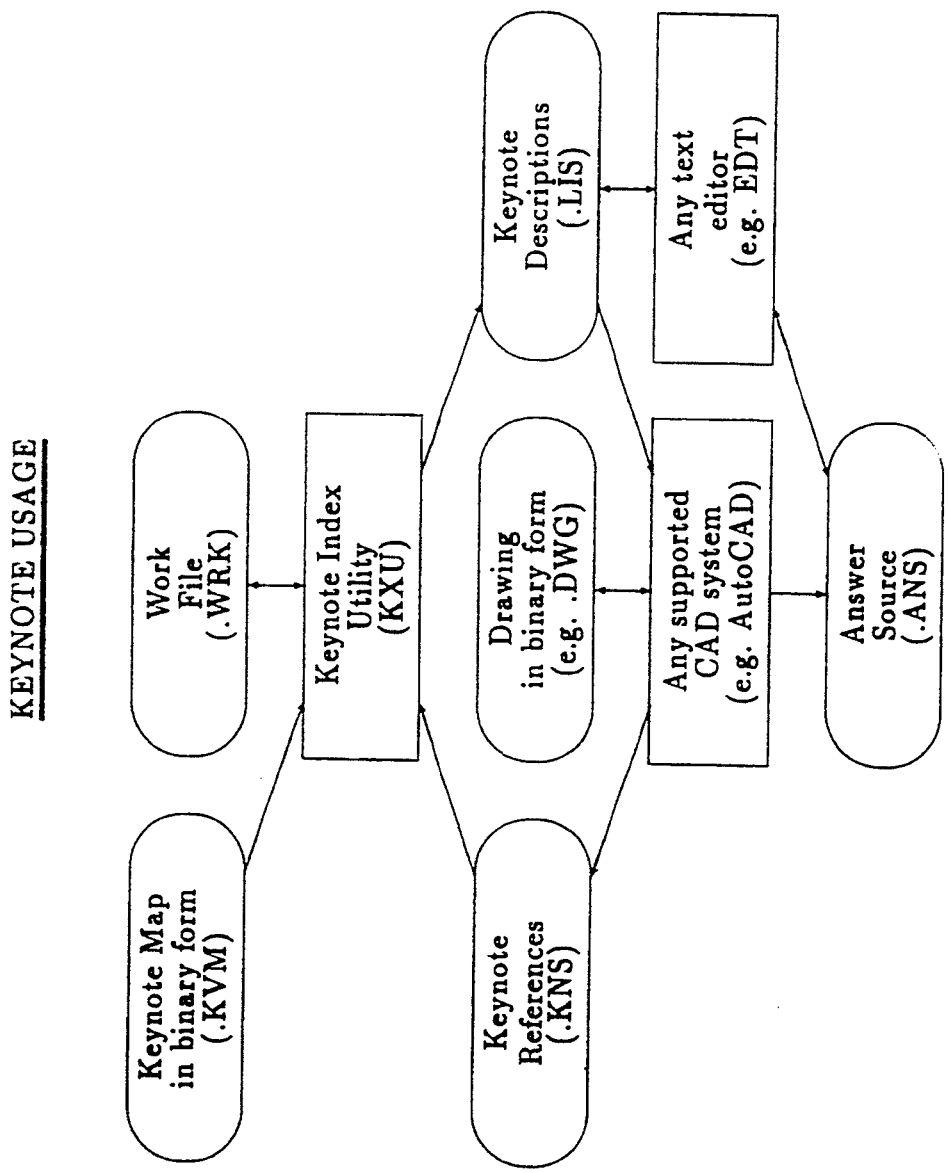
Figure 6C:
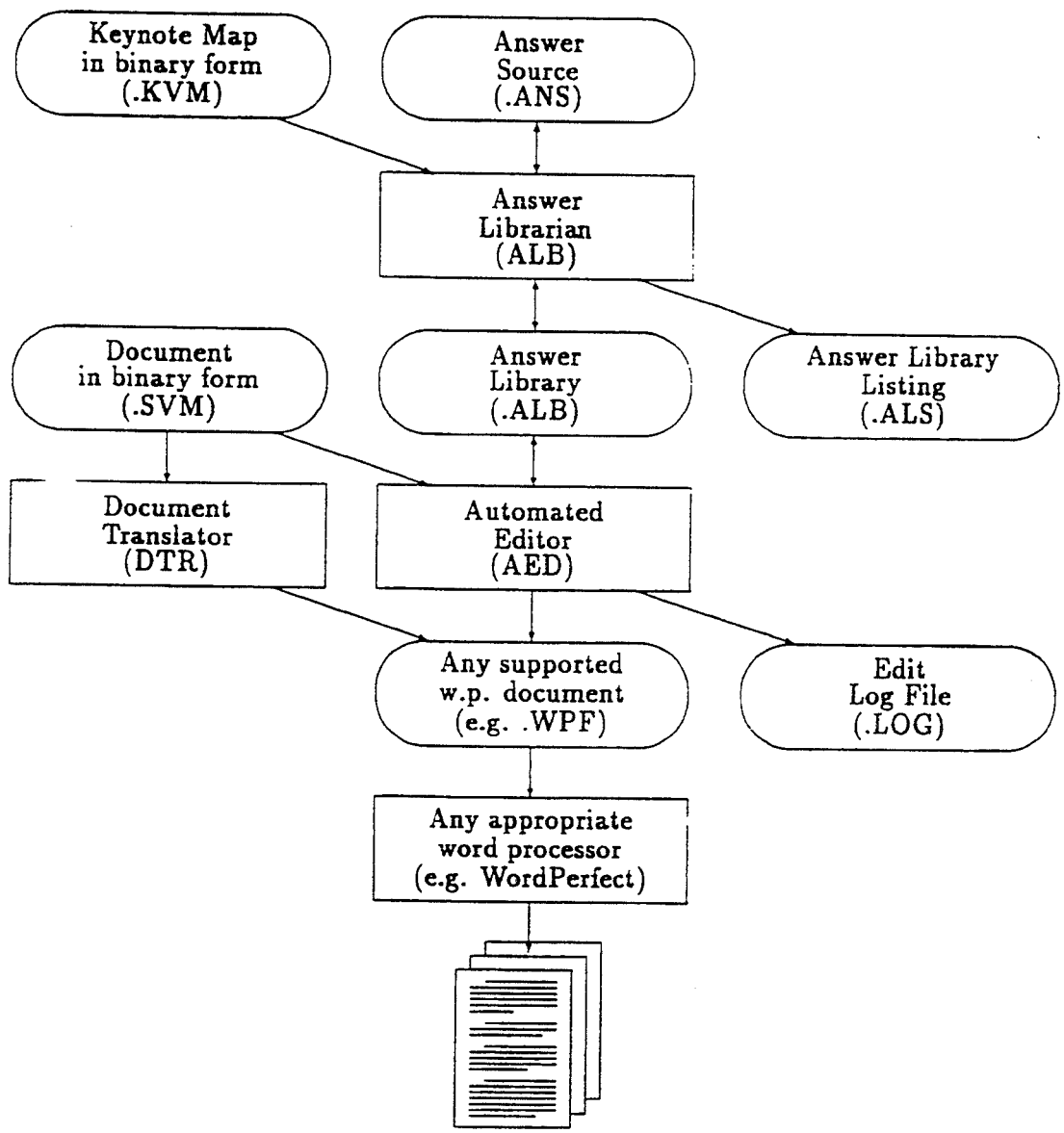

The relationship between the various programs and the data which they instruct the computer to manipulate is shown schematically in FIGS. 6A–6C. These programs functionings are depicted in blocks 32, 36, 37, 42, 51, 55, and 56. The data base is contained in the file or groups of files depicted in blocks 34, 35, 38, 39, 40, 48, 49, 50, 52, and 53. The programs depicted by the blocks 30, 33, 46, 47, and 59 are programs which are commonly available on computer systems used to support architectural and engineering practice. The data files depicted by blocks 31, 41, 43, 44, 45, 54, 57, and 58 are used to convey information among various programs or between humans and various programs. The file types indicated within parentheses within the blocks which depict data files, are the preferred file types, but other file types are permitted.

Hereinbelow, the various programs of the system of the present invention are described as though they were active agents. It should, however, be understood that it is the computer which is the actual active agent and that what is described is the appearance resulting from the execution of the instructions of the program by the computer.

Data Base Preparation

FIG. 6A shows the portions of the data and instructions which deal with the construction of the static portions of the data base, that is the relations set out in FIGS. 3A and 3B. The document data base, that consisting of the relations shown in FIG. 3A, is implemented as a set of files, one for each document in the master specification. Each file, as depicted in block 38, of FIG. 6A, contains all of the information in the document relations which pertain to a single document. The keynote map data base, that consists of the relations in FIG. 3B, is contained in the single file depicted in block 39. The following is a description of how these files are constructed.

Document Construction

Figures 7D, 8A:
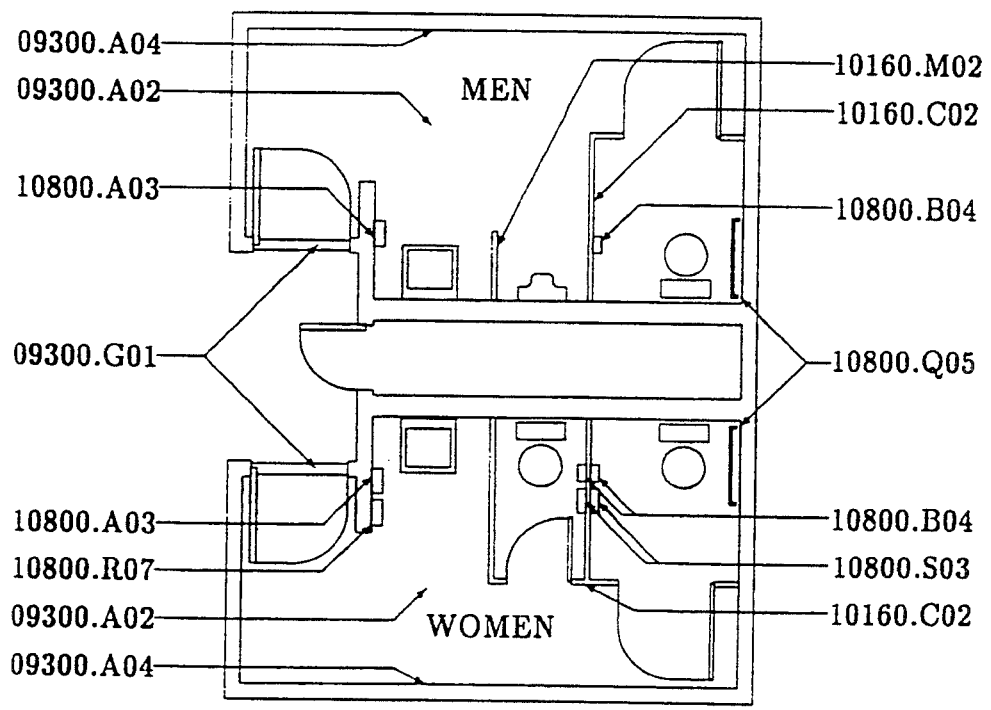

Each document file in the data base is constructed from an ASCII text description, referred to as a Structured Text file, block 34, using the Document Compiler, block 36. The goal of the compilation is the production of a document representation which supports efficient execution of the operations described in FIGS. 5A–5F. Thereby the compiled version of a document may be larger than its Structured Text representation. The Structured Text representation takes the form of an ordered list of element descriptions. FIG. 7B gives a grammar, in BNF-like form, for one possible language that is appropriate for use as the Structured Text representation of a document. FIG. 7A describes the terminal grammar symbols used in this grammar as well as those in FIGS. 7C and 7D. FIG. 12A shows a portion of a document which conforms to the given grammar. The relationship between the productions of which grammar and the elements of which data base is therefore obvious. In this application, the elements are identified by numbers which are not required to be sequential nor ordered, and are used only to refer to a particular element in a support expression or the "Delete" command. The compiler maps these numbers into sequence numbers which correspond to the attribute ELEMENT.ID in FIG. 3A and which preserve the order of the elements as they occur in the Structured Text file of FIG. 6A.

The Structured Text form of a document may be obtained in several ways; FIG. 6A shows two. The conceptually simpler of the two, is to type the description using any text editor or word processor that is capable of reading and writing plain ASCII text files, shown at block 33. The other approach is to convert an existing computer readable representation of the document. For example, MASTERSPEC is available on diskettes suitable for use with the WordPerfect word processor, of block 30. Documents in this form are preferably converted to Structured Text form using the Masterspec Document Converter, block 32. This program reads the WordPerfect file containing the document, block 31, and discerns the subordination structure for the text based on indentation and other features of the document in the same way a human reader would. The document is then written as a Structured Text file, block 34, with the subordination structure encoded in the support expressions of the elements. The symbol associated with each "Text" element identifies the implicit format of the element.

The Masterspec Document Converter, block 32, only produces "Text" elements, and the "Question" and "Control" elements are added with a text editor, block 33. Additionally, the semantic structure of the document must be added manually. This structure describes relationships, other than subordination, between elements of the document. Unlike the subordination structure, these relationships cannot be easily discerned by examination of the document formatting, but requires an understanding of the document content itself. These relationships are encoded in the support expressions in a manner similar to the subordination structure.

A special document file, referred to as the index document, is constructed for the specification. This file contains a single "Question" element whose alternatives correspond to all of the individual section documents which constitute the master specification. The command sequence that is executed when any particular alternative is selected contains a single "Require" command which names the corresponding section document. This index document is the one which corresponds to the document supplied to the function "prjspc", shown in FIG. 5A.

Keynote Map Construction

Similar to the construction of the document files, set out above, the keynote map data base is constructed from an ASCII text description, block 35, using the Keynote Map Compiler, block 37. The goal of this compilation is also the production of a representation which supports efficient execution of the operations, as described in FIG. 5G, rather than obtaining a compact size. Thus, the compiled version of the map may be larger than its text representation. FIG. 7C gives a grammar for one possible language that is appropriate for use as the text representation of a keynote map.

The map, as a whole, is an implied level, i.e., the root or top level, which consists of a list of attribute declarations and a body. The relationship between the productions of the grammar for the attribute and property declarations and the tuples in the relations ATTRIBUTE and PROPERTY, shown in FIG. 3B is apparent from the discussion. The body of the map is a list of attribute assertions, keynote definitions, sublevel definitions, and file references. The attribute assertions declare various properties which are to be associated with all keynote definitions and nested sublevel definitions which follow. These assertions take two forms. The first that consists of two symbols separated by an equal sign, asserts the property named by the second symbol as the "value" of the attribute named by the first symbol. The asserted property supersedes any previous assertion for the same named attribute. The second form of assertion, consists of a single symbol, and retracts any current assertion for the named attribute. All properties and attributes named in the assertions must be appropriately declared in the level in which they occur. Specifically, attributes and properties may not be named in assertions occurring in outer levels or nested sublevels.

The relationship between the keynote definition productions and the relations NOTE and MAP is believed to be apparent from this discussion. The two symbols which constitute an answer correspond to MAP.Ques and MAP.Ans, respectively. All asserted attributes, for the current level and all enclosing outer levels, which are in effect when a keynote definition is encountered are recorded in the relation NOTECHAR.

A sublevel definition that occurs in the body of a parent level is recorded in the LEVEL relation. All asserted attributes for the parent level only, which are in effect when the sublevel definition is begun, are recorded in the LEVELCHAR relation. A file reference is a form of sublevel definition where the contents of the named file form the definition of the sublevel. The syntax for the contents of the file are the same as for the map as whole. This feature allows the portion of a keynote map which contains notes that pertain to a specific section of the master specification to be defined in a separate file which is more easily maintained.

Keynote Usage

FIG. 6B shows, in schematic form, an example of how information in a keynote map is typically used to construct files, called Answer Source files, which constitute the primary source of information represented by the tuples of the KEYNOTES relation in FIG. 3C. Shown therein is the interaction between the Keynote Index Utility block 42, and a CAD system, block 46, which is typical for applications in architecture and engineering. The Keynote Index Utility may also be used by itself for looking up keynotes that are incorporated into manual drawings. In the present application the Answer Sources would be created and maintained by hand, using any appropriate text editor, illustrated by block 47. Other programs which support customized interfaces can also be used in place of the CAD system, block 46, for applications other than architecture and engineering, or data sources other than drawings.

The primary component of FIG. 6B is the CAD system, block 46, that is under the direction of a user. For the preferred embodiment, AutoCAD 386 release 10, by Autodesk, Inc., is used as the CAD system to create and manipulate drawings which are stored in files, block 44. It should be understood however, that other CAD systems can be used within the scope of this disclosure, to perform these functions. The drawings contain keynote references which may be represented in different ways depending on the nature of the CAD system. In AutoCAD, a convenient way of representing a keynote reference is as a "block" with an attribute whose value is the referenced note name. Such blocks appear on the drawings as normal text, but may be easily extracted and placed into an external file. FIG. 8A shows a portion of a drawing which contains a number of keynote references produced by this method.

The keynote references are entered into the drawings by the CAD system using information supplied by the user that consists, in part, of a keynote name. The user may supply this name as part of a CAD system command, or in response to a CAD system prompt. The nature of this interaction is dependent upon the CAD system used. For the preferred embodiment, several custom commands were written in AutoLISP, Autodesk's dialect of LISP, which system allows a user to insert keynotes into a drawing as described below.

Since the number of keynotes defined for use with a particular master specification is large (for example, on the order of 10,000 to 20,000), finding the name of the desired note would be practically impossible without computer assistance. The Keynote Index Utility, block 42, provides for quickly looking up the desired note name. The program has two modes of operation, interactive and batch. In the interactive mode, the user browses the keynote map, block 40 for the desired note or notes and, optionally, has them written to a file, block 45. As the program executes, it maintains information about its state in a work file, block 41. When the user exits the program, this file is saved and when the program is restarted, the user may direct it to restore its state from the work file.

Figure 9C:
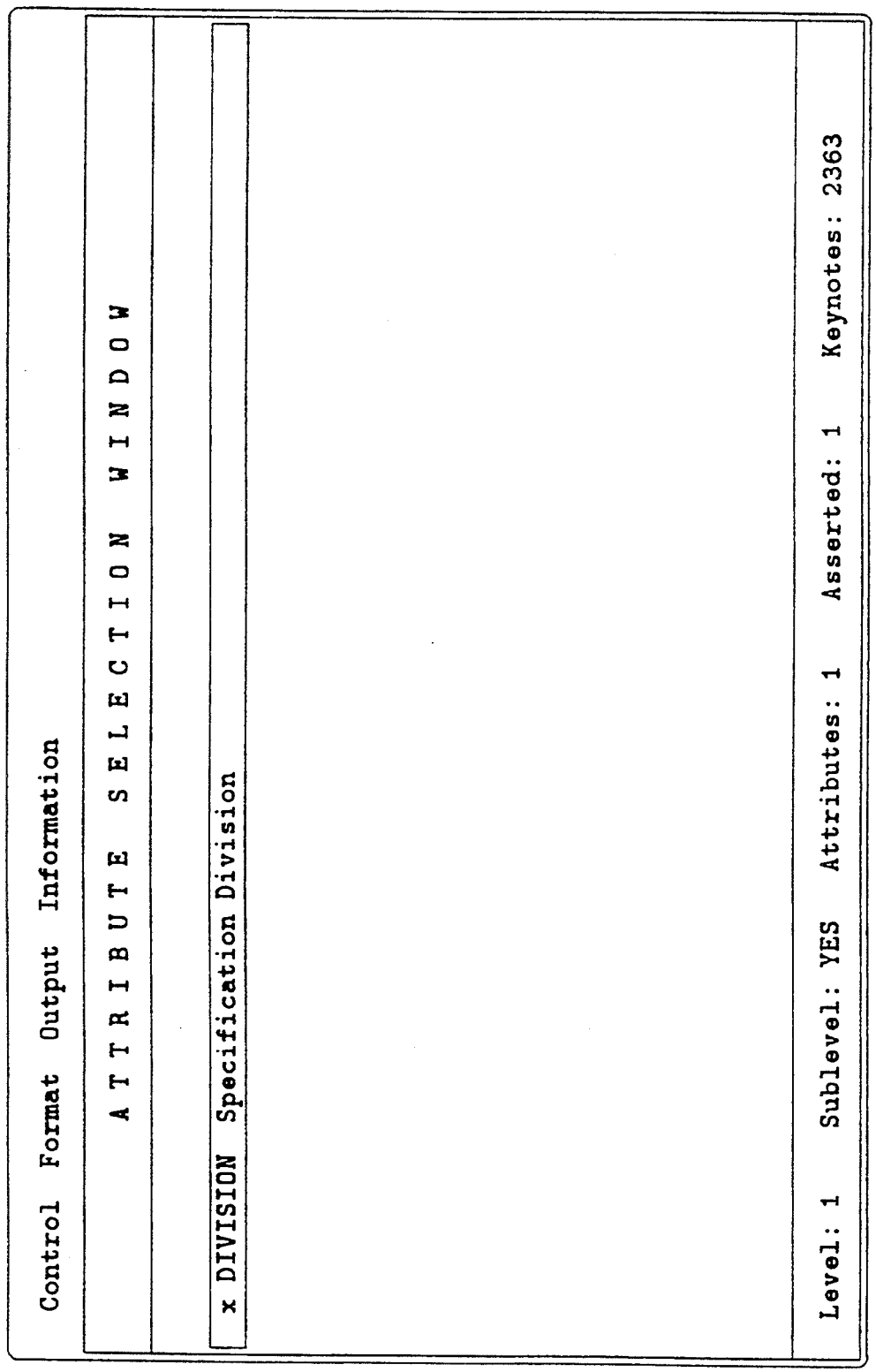
FIGS. 9A-9O show a sequence of display screens as are presented during browsing on a keynote map utilized with a master specification.

The browsing operation of the program is illustrated in FIGS. 9A–9O, which show a sequence of display screens as would be presented during a browsing session on a keynote map used with MASTERSPEC. FIG. 9A shows the initial display which indicates that the root level of the keynote map has one declared attribute named DIVISION. No attributes are currently asserted and there are 26343 keynotes which match the asserted attributes, that is, the full map. The user may select to assert any attribute at this level; in this case the single attribute, DIVISION. FIG. 9B shows the next display which indicates the defined properties for the attribute. The user highlights the desired property and selects it. The program then returns to the previous display, FIG. 9C, which now indicates that there are 2363 keynotes which have the single asserted property. Further, there is shown a sublevel in the map that will correspond with the asserted attribute.

If the user desires to further restrict the set of keynotes to examine, the sublevel may be viewed as shown in FIG. 9D. This level has two defined attributes, SCOPE and SECTION, neither of which is asserted. If the user chooses to assert the SCOPE attribute, the list of defined properties is displayed, FIG. 9E, and the user may make the desired selection. The program then returns to the previous display, FIG. 9F, which now indicates that there are 1658 keynotes which correspond to the asserted properties of DIVISION and SCOPE. A further narrowing of the set of keynotes can be performed by selecting additional attributes and sublevels as shown in FIGS. 9G–9M.

Figure 9N:
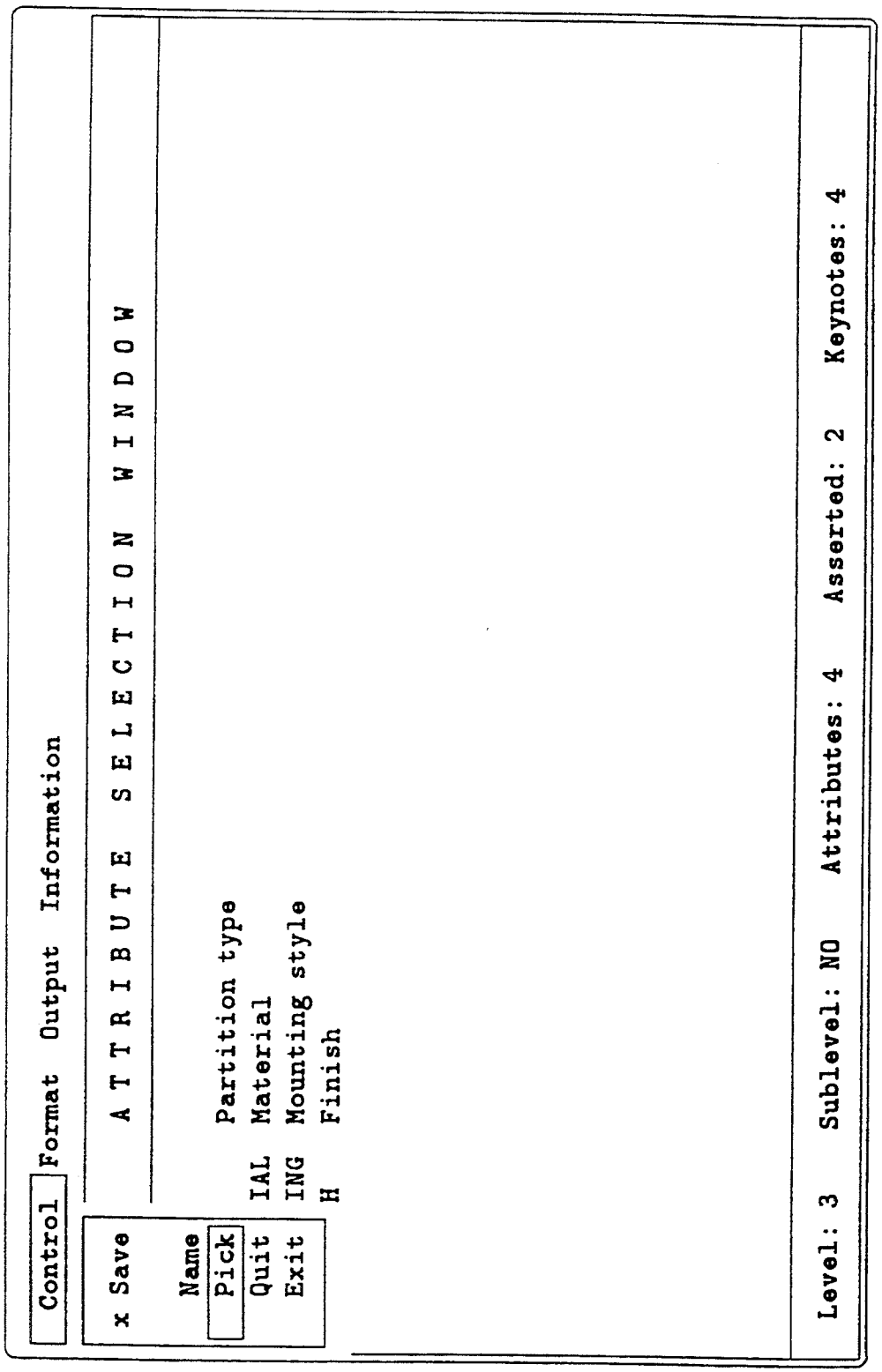

At any point in the browsing process, the user may elect to see all of the keynotes that correspond to asserted attributes. For example, FIG. 9N shows the exercise of this option via the "Pick" selection on the "Control" pulldown menu. This option will display the four (4) keynotes which constitute the set of notes resulting from the interaction in the previous figures. FIG. 9O shows the display of the keynotes from which the user may select. The status window at the bottom of the display indicates that one (1) keynote must be selected if the user desires to have keynotes written to an output file. Furthermore, at most one (1) keynote may be selected for output. These limiting values are specified when the program is started. This particular set of limits is common when the program is executed by a CAD system as described below. For a typical user initiated execution, these limits would be "NONE" and "ANY", respectively.

As can be seen from the above example, the desired keynote may be selected quite rapidly. The program responds quickly at each step due to the structure of the keynote map, thereby facilitating the operations illustrated in FIG. 5G. The function "sub" is performed to determine if there is a sublevel corresponding to the current set of asserted attributes. The function "attrs" is used to obtain the list of defined attributes for the current level, and the function "props" is used to obtain the list of properties for a particular attribute. The functions "notes" and "pnotes" are used to obtain the set of notes which correspond to the asserted attributes.

In many CAD systems, facilities are provided for the execution of other programs from within the CAD system itself. Thus, a user may utilize the Keynote Index Utility, block 42, of FIG. 6B, from within the CAD system in order to look up a keynote name. Some CAD systems also allow the user to define new commands. Both of these features can be used in AutoCAD to provide a means of automatically executing the Keynote Index Utility, block 42, and using the output file it produces to insert a keynote reference into a drawing. For example, a user defined command was created which executes the Keynote Index Utility, block 42, and requests that a single note name be written to a specific temporary file, block 45. The user interacts with the Keynote Index Utility, as described above to select the single desired note. The Keynote Index Utility then places this note name into the requested file and returns control to AutoCAD. The custom command then completes the insertion process by reading the note name from the temporary file written by the Keynote Index Utility.

In addition to keynote references, a drawing also preferably contains a legend that consists of the text description of all notes as are referenced on the drawing. The preferred embodiment provides a set of custom commands for defining and generating a keynote legend on the drawing. This legend contains the name and description of each drawing note. FIG. 8B shows an example of what such a legend would look like for the plan component shown in FIG. 8A. The text of the legend can be produced by using the Keynote Index Utility in its batch mode. AutoCAD, through Auto-LISP provides facilities by which a custom command can extract the keynote references and write them to a file, block 43, of FIG. 6B. This file is then give to the Keynote Index Utility, block 42, to process in its batch mode. The program reads the referenced keynote names and produces a sorted list of the note descriptions which are written to an output file, block 45. The text in this file is then read by the custom command procedure and inserted into the drawing.

The file of extracted keynote references as are used to construct the keynote legend for a drawing is also directly usable as an Answer Source file, block 48. In the preferred embodiment, a separate custom command is provided which extracts the note references and writes them to a file with the same name as the drawings name, but with ".ANS" as the file type. This permits the same temporary file to be used whenever a keynote legend is generated while allowing an Answer Source for each drawing to be generated and retained without file naming conflicts.

Document Processing

The processing of the documents of a master specification to yield a project specification is illustrated in FIG. 6C. Central to this processing is the project knowledge base. This knowledge base 23 of FIG. 1 is also represented by the data base relations shown in FIG. 3C. In the above conceptual description, the information in the ANSWERS and KEYNOTES relations was treated as being independent of each other. In the preferred embodiment, they are merged together. The information corresponding to the KEYNOTES relation is contained in a set of Answer Source files, block 50. These files are produced as described above and contain information for a single project. The information corresponding to the ANSWERS relation is contained in an Answer Library, block 53 of FIG. 6C. A separate library is maintained for each project, and thus no explicit project name is required in the data contained within the library.

The Answer Library, block 53, of FIG. 6C, for a given project, in addition to the information corresponding to the ANSWERS relation, contains a form of the information described in the Answer Source file, block 50, for the project. In this sense, the library can be viewed as the set produced by the "kb" function shown in FIG. 5H, but with the source information for each question and answer pair retrained. In addition, the library is used as the repository for information obtained by the execution of commands encountered during the processing of documents. Thus the library further functions as the set of question and answer pairs supplied to and returned from the function "prp" shown in FIG. 5B. Further, the set of required documents and the set of completed documents supplied and returned by the function "prp" are stored in the Answer Library for the project. This enables the document production process to be performed over time rather than in a single session.

Knowledge Base Maintenance

The Answer Librarian, block 51 of FIG. 6C, performs the major maintenance operations on the project knowledge base contained in the Answer Library, block 53. The librarian views a library as a collection of sources where each source corresponds to the set of tuples in the ANSWERS relation which share a common value for the attribute ANSWERS.Src. When a library is created for a new project, it is empty. The user may instruct the librarian to insert any number of Answer Source files, block 50, into the library using a keynote map file, block 49, to convert the keynote references to question and answer pairs. This corresponds generally to the second major term in the definition of the set produced by the function "kb" in FIG. 5H. The Answer Source files 50 of FIG. 6C may contain question and answer pairs in addition to keynote names. FIG. 7D is a grammar which describes the format of an Answer Source file.

Once a library has been constructed, the librarian can replace sources which have been updated. This operation is similar to the insertion operation, but first all question and answer pairs as are attributable to the sources being replaced are removed from the library. The new Answer Source files, block 50, FIG. 6C, are then inserted into the library as described above. The librarian also has the ability to delete entire sources or all tuples with a common value corresponding to the attribute ANSWERS.Ques. Various information about the contents of a library can be written to a listing file, block 54. The librarian can also extract a copy of a source and write it to an Answer Source file, block 50. This extraction yields only question and answer pairs, not any keynotes which may have given rise to them during an insertion or replacement operation.

Editing

The editing of documents of the master specification is performed by the Automated Editor, block 56. Which, in addition to the Answer Librarian, is also used to modify the Answer Libraries. The Automated Editor, block 56, has two major modes of operation, manual and automatic. While these two modes have many similarities, for the purposes of this discussion, manual mode will be viewed as primarily an information gathering mode, and automatic mode will be viewed as primarily a document processing mode.

The manual mode of the Automated Editor, block 56, provides an interactive means of entering and modifying the information in the ANSWERS relation, that is, information which is not typically obtained from Answer Source files, block 50. However, since the information obtained from all sources is maintained in what amounts to a single relation corresponding to the set yielded by the function "kb" in FIG. 5H, the manual mode may be used to review and alter information obtained from Answer Source files, block 50 of FIG. 6C, as well.

When Automated Editor, block 56, is started, it is given a project Answer Library, block 53, and optionally, one or more documents, block 52. If documents are specified, their names are used as answers to the first of two special questions. These two special questions, along with their answers, are stored in the Answer Library, block 53, in the same form as the other information, but with the user directly indicated as the source. The first of the two questions is, "What documents remain to be processed?" The second question is, "What documents have been processed?" Since the named documents are to be processed, they are thus answers to the first question.

The manual mode of operation of the Automated Editor, block 56, is essentially the evaluation of the function "prp", shown in FIG. 5B, with some modifications, where the first of the four sets is the Answer Library, block 53. The second and third sets (that is, the set of required documents and the set of completed documents, respectively) are the set of answers to the two special questions described above. The last of the four sets is the set of deleted elements, which is initially empty. While the definitions of the functions in FIGS. 5B through 5D are constructive in nature (that is, objects, such as sets, are not altered, but are only used to construct new objects), the implementation in the Automated Editor, block 56, performs destructive operations on the sets, i.e., the Answers Library, block 53, is modified as the operation proceeds.

The Automated Editor interacts with the user through a series of questions. A typical example of the first question in the series is shown in FIG. 10A. This question solicits the next document to process from the set of documents still to be processed. The user may select a single document or a set of documents to be processed as a group. This question can be viewed as the selection operation implicit in the first case in the definition of the function "prp" The remainder of the questions of the series are obtained from the documents themselves. This is accomplished by a modification to the first case in the definition of the function "prq" in FIG. 5B. Just prior to the evaluation of the function "exq", the user is asked the question which is about to be executed. The user is shown the current answers to the question and is given an opportunity to change them. Any changes are reflected in the Answer Library, block 53, and thus affect the execution of the question.

FIGS. 10B through 10D show some of the questions as would be asked relating to Section 10160 of MASTERSPEC that is based on the selected keynote in FIG. 9O. FIGS. 10B through 10D show questions which are answered by the keynote. However, the question shown in FIG. 10E requests information which is not typically available from keynotes and must be supplied by the user.

The automatic mode of the Automated Editor, block 56 of FIG. 6C, is similar to the manual mode, but there is no interaction with the user except for the selection of documents to process. Thus, automatic mode is simply the evaluation of the function "prp" with none of the modifications for manual mode described above.

The Automated Editor, block 56, may also be operated in a combined automatic and manual mode. In this mode, each document is processed in automatic mode. Then, if any of the questions present in the document remain unanswered, that is, have too many or too few answers selected for them, they are presented to the user in the same manner as for manual mode.

When the Automated Editor, block 56, is started, it can be directed to select all documents for processing, that is, to select all of the answers to the first of the two special questions. This option is valid for both modes, but is typically used with the automatic mode to process an entire specification. In this case, the index document for the master specification is specified and thus this operation is equivalent to evaluating the function "edit" in FIG. 5A with the index document and an empty set of deleted elements. Typically the user will use manual mode to edit the various individual documents of the master specification and supply the information which is not obtainable from keynotes referenced in the various Answer Source files, block 50. Once the Answer Library, block 53, for the project contains all of the pertinent information, the automatic mode with automatic document selection is executed to perform the complete edit of the master specification.

Document Translation

Once the Automated Editor, block 56, has edited a document, it may be optionally written to an output file, block 57, in any of several supported word processor formats, for example, WordPerfect. This output operation corresponds to the function "outdoc" in FIG. 5A, but is performed after each document is edited rather than after the complete specification has been edited as in the function "prjspc". Only the "Text" elements which have not been deleted and which have support, that is, their support expressions evaluate to "true", are used in the output operations. The definitions of "outdoc" and "outelem" together indicate that the elements are written as a sequence to the output file. In fact, the Automated Editor, block 56 interprets the sequence of elements as a stream of tokens, each of which has a type indicated by the symbol associated with it (that is, TEXT.Symbol in FIG. 3A). This stream is parsed to yield an abstract syntax tree for the document. This tree captures the subordination structure of the edited document which is then used to construct the actual output file which contains not only the text of the document, but also all of the required formatting information needed by the target word processor, block 59, of FIG.

6C. The stream of "Text" element tokens parsed by the Automated Editor, block 56, forms a statement in a formal language. The statements in this language correspond to valid documents, that is, documents whose subordination structure is "correct". This notion of "correctness" depends on the type of document being processed. For example, the structure of an architectural specification is different from the structure of a product user's manual. Even among the commonly used master architectural specifications there are significant variations in the structure of the documents. The Automated Editor, block 56, recognizes a different language for each type of master specification it supports. FIGS. 11A and 11B describe the language used for MASTERSPEC documents. FIG. 11A lists the various token types which are acceptable in a MASTERSPEC document. FIG. 11B gives a context-free grammar for the language. This language describes the structure of three types of documents: index documents, basic documents, and short language documents. The index documents are those special documents described above which are used to select the various sections of the master specification which are required for the project specification. These documents contain a single "Text" element, in addition to the typical single "Question" element, which identifies the document as an index document. The basic documents are specification sections which are in the standard three-part format. They constitute the bulk of the MASTERSPEC master specification. The short language documents are specification sections which are in an abbreviated form, that is, not the standard three-part form.

From the above grammar, a parser can be constructed which can translate the stream of "Text" element tokens into an abstract syntax tree. The abstract syntax tree constitutes a representation of the document which is still format independent, for example, it only represents the logical structure of the document, not its appearance on the printed page. From this representation, various formatted forms of the document may be generated. FIGS. 12A through 12C show a portion of a MASTERSPEC section in its Structured Text form, that conforms to the grammar set out in FIG. 7B, and its corresponding block format and paragraph numbered variants, respectively.

Note that the order of information in the Structured Text description of FIG. 12A of the section is not always that which is required for the formatted output and that some elements are used for multiple purposes. For example, the elements five (5) and fifteen (15) are utilized to construct the footer of the document, but in the reverse order. They are also used to construct the section title. A more complex example, not shown, can be found in tables where entries within columns wrap onto several lines. For word processors which do not have explicit table support, the various lines of a table must be constructed from pieces of text that are obtained from each column. This is facilitated by the abstract syntax tree structure which provides a logical description of a table which can be analyzed as a whole in order to produce the appropriate output sequence. Note also that some of the text in the formatted forms is not explicitly present in the Structured Text form, for example, note the SECTION in the section title, PART 1 in the part title, and the paragraph numbers in the paragraph numbered variant. The rendition of various portions of the text is also altered in the output forms. For example, the section title is underlined in the block format variant of FIG. 12B even though it is not indicated in the Structured Text description of FIG. 12A. Yet, the same text used in the footer is not underlined. In addition, all of the underlining has been suppressed in the paragraph numbered variant. Many word processors have facilities for striking out text which can then be removed automatically at a later time. The Automated Editor, block 56 of FIG. 6C, provides an option during the output of a document where the entire document is written to the output file, not just the undeleted elements. The portions of the output text which correspond to the deleted elements are marked to be struck out.

There may be times when a word processor form of a complete, unedited section is desired. The Document Translator, block 55, performs the same output operations as performed by the Automated Editor, block 56, but does so on the entire sequence of document "Text" elements.

Final Editing and Printing

The documents produced by the Automated Editor, block 56, constitute the roughly edited project specification. They correspond to the results of the first editing pass described above. The second editing pass is performed by the writer using the word processor of choice, block 59. During this second pass the writer must insert any additional information as is required which is not part of the master specification. At this time, the writer may also choose to alter some of the information which was derived from the master specification. If the output generated by the Automated Editor, block 56, was created with the strike out option described above, the writer may also review the proposed edits and adjust them if desired.

Since the output from the Automated Editor, block 56, may be used with a word processor, the appearance of the final documents may be altered to suit personal preferences. For example, the desired font may be changed or a different header or footer may be employed. The printed form of the final specification, shown at block 60, is thereby produced with the printer 29 of the computer system 25 of FIG. 2. A finished project plans and specifications is thereby produced wherefrom a building is constructed. Accordingly, the finished plans and specifications are fully representative of the finished building.

Applicants hereinabove have set out a preferred embodiment of the present invention in a structured text system for production of a finished plans and specifications. While preferred forms of the invention have been shown and described herein, it should be understood that the invention may be embodied in other arrangements without departing from the spirit or essential character as shown and described. The present disclosure should therefore be considered in all respects to be illustrative and is made by way of example only and that variations thereto are possible without departing from the subject matter and reasonable equivalency thereof coming within the scope of the following claims, which claims we regard as our invention.

We claim:

1. A structured text system for generating a project specific derivative of a master specification which derivative is specialized for use in a specific project for which the master specification pertains comprising:
   a data base comprising:

i. a master specification organized as master documents one of which said master documents is designated as the first document of the specification and each of said master documents consists of an ordered list of elements wherein each element of said list of elements describes one of:
   A. a content element comprising a portion of the master document;
   B. a question element comprising a multiple choice question including a description of each valid alternative selection pertaining to said question, a description of actions required to edit said master specification upon selecting said valid alternative selection to answer said question and a description of actions required to edit said master specification upon not selecting said valid alternative selection to answer said question; or
   C. a control element comprising descriptions of actions required to edit said master specification;
ii. a master keynote list comprising a set of notes wherein each said note is a uniquely labeled description and a set of answers, each answer of said set of answers identifies one of said multiple choice questions associated with one of said master documents in said master specification, said answer further identifies an allowable alternative for the identified question;
iii. a project knowledge base for characterizing a specific project comprising;
   A. a set of keynote references wherein each such reference identifies one note in said master keynote list; and
   B. a set of answers, wherein each said answer identifies one of said multiple choice questions associated with one of said master documents of said master specification, and said answer further identifies one of a number of allowable alternatives for said identified multiple choice questions;

a device consisting of:
  a stored program computer means for performing the functions of a structured text system, and said stored program computer means includes:
    a long term read/write storage means for storing said data base and system programs which said long term read/write storage means is for retaining data electrical power being applied to said long term read/write storage means, wherein said long term read/write storage means is further implemented, under control of said stored program computer means, for selectively altering and erasing data previously written to said long term read/write storage means;
    an optional read-only storage means for storing portions of said data base that are not modified by the performance of the functions of said structured text system and for storing systems programs, wherein said read-only storage means retains a permanent and retrievable record of the information contained therein;
    a manual input means for communicating information from a user to said stored program computer means;
    a display output means for communicating information from said stored program computer to a user;
    a hardcopy output means for producing a printed copy of said project specific derivative of said master specification;
  system programs that describe, by implementation by said stored program computer means, actions to be performed by said stored program computer means for carrying out operations utilizing said data base to produce said project specific derivation of said master specification, by:
    i. means for creating a project knowledge base using sources of project specific knowledge which sources include information generated by a user through said manual input and display means; and documents and data bases, each of said sources being stored in said long term read/write or read-only storage means, which project specific knowledge is present in the form of identifications of notes in said master keynote list or identifications of an alternative, wherein said alternative is one of a number of allowed alternatives to an identified question, which said question is described by one of said master documents of said master specification;
    ii. means for constructing a working knowledge base comprising a set of answers wherein each said answer of said set identifies one of said multiple choice questions associated with one of said master documents in said master specification, and further identifies one of said allowable alternatives for said multiple choice question and which said working knowledge base is the union of said set of answers of said project knowledge base with each set of answers in a collection of sets of answers, the collection comprising one set of answers for each said keynote reference in said set of keynote references of said project knowledge base, which said set of answers is the set of answers in said master keynote list identified by said keynote reference;
    iii. means for editing said master specification comprising means for constructing a derivative of each master document of said master specification, such construction comprising;
      A. means for making a copy of said master document;
      B. means for evaluating each question element of said master document copy, by performing, upon the master document copy, editing actions as described by each of said alternatives to said multiple choice question as described by said question element, which actions are those described by said alternative as being required to edit said master specification when said alternative is chosen to answer said multiple choice question and an answer is present in said working knowledge base, which answer identifies said multiple choice question and said alternative described by said question element, otherwise the actions are those described by said alternative as being required to edit said master specification when said alternative is not chosen to answer said multiple choice question;
      C. means for performing, upon said master document copy, editing actions described by each said control element of said master document copy;

D. means for adding information obtained from a user through said manual input means to said master document copy, which information is not part of said master document; and E. means for transcribing said edited master document copy into its final form; and iv. means for assembling the derivative of said master specification from the final transcribed derivatives of said master documents.

2. A structured text system as recited in claim 1, wherein the master keynote list is augmented with index and cross-reference information to facilitate searches for specific notes.

3. A structured text system as recited in claim 2, wherein the system programs include a program or programs that describe actions to be performed by said stored program computer means whereby said stored program computer means uses the index and cross-reference information in a search for specific notes based on information obtained from a user through the manual input means of said stored program computer means in response to information presented to said user through the display output means of said stored program computer means and references to said specific notes are placed into knowledge sources stored in the long term read/write storage means of said stored program computer means.

4. A structured text system as recited in claim 1, wherein each keynote reference in the project knowledge base also identifies the source of the reference and each answer in the set of answers for the project knowledge base also identifies the source of the answer.

5. A structured text system as recited in claim 4, further including modifying the project knowledge base by:

removing from said project knowledge base all keynote references and answers that identify a specific source; and adding to said project knowledge base all keynote references and answers as are available from said source.

6. A structured text system as recited in claim 5, wherein the system programs include a program or programs that describe actions to be performed by said stored program computer means whereby said stored program computer means modifies an existing project knowledge base in said computer means long term read/write storage means using a set of sources that are either in said long term read/write storage means or in one of said stored program computer means optional read-only storage means, said set of sources being selected by a user at said stored program computer means manual input means.

7. A structured text system as recited in claim 1, wherein the system programs include a program or programs that describe actions to be performed by said stored program computer means whereby said stored program computer means presents information to a user through said display output means of said stored program computer means that is obtained from the project knowledge base and the master specification and which said information is displayed at said stored program computer means display output means for review by said user; and further, said computer means is provided with other information from said user through said stored program computer means manual input means, which said other information is provided for the purpose of altering said project knowledge base that is stored in said stored program computer means long term read/write storage means, with actions performed by said stored program computer means constituting interactive project knowledge base review and modification.

8. A structured text system as recited in claim 7, wherein the programs that describe actions to be performed by said stored program computer means, that perform interactive project knowledge base review and modification, describe such actions to be performed as a part of the actions that direct said stored program computer means to evaluate each question element of the master document during the editing of said master document of the master specification.

9. A structured text system as recited in claim 1, wherein each element of each document of the master specification has a unique element identifier with respect to the master document that each said element is a part of.

10. A structured text system as recited in claim 9, wherein the editing actions described by the question elements and the editing actions described by control elements include a declaration of the deletion of elements of the master document from the master document copy in the project specific derivative of the master specification and the inclusion of copies of specific documents of said master specification in the project specific derivative of the master specification.

11. A structured text system as recited in claim 9, wherein each element of each document of the master specification also contains a support expression that is a description of the conditions under which said element is to be retained as part of a derivative document.

12. A structured text system as recited in claim 11, wherein the question elements which are evaluated during the editing of a master document of the master specification are those question elements that have not been deleted from the master document copy by some previously performed editing action and that meet the conditions for retention in the derivative document that are described by the support expressions of said elements.

13. A structured text system as recited in claim 12, wherein the question elements are evaluated in the order in which they occur within the master document.

14. A structured text system as recited in claim 13, wherein each evaluated question element is evaluated by processing each alternative described by said question element, where said processing comprises;

a determination of the presence of an answer in the working knowledge base that identifies the question and alternative; when said answer is present in said working knowledge base, the editing actions described by said question element when said alternative is selected are performed; or where said answer is absent from said working knowledge base, the editing actions described by said question element when said alternative is not selected are performed.

15. A structured text system as recited in claim 14, wherein the alternatives of each evaluated question element are processed in the order in which they are described in said question element.

16. A structured text system as recited in claim 11, wherein the control elements as are evaluated during the editing of a master document of the master specification are those that have not been deleted from the master document copy by a previously performed editing action and meet the conditions for retention in the derivative document, as are described by the support expressions of said control elements.

17. A structured text system as recited in claim 16, wherein the control elements are evaluated in the order in which they occur within the master document.

18. A structured text system as recited in claim 17, wherein each evaluated control element is evaluated by performing the editing actions as are described by said control element.

19. A structured text system as recited in claim 11, wherein the content elements of the master specification describe a portion of a document that consists of an identification of a syntactic relationship of said described portion of said document relative to other portions of said document, and a content description that is devoid of document layout information.

20. A structured text system as recited in claim 19, wherein the content description of the content elements describes the text of a portion of a document that is unformatted text.

21. A structured text system as recited in claim 20, wherein the system programs include a program that describe actions to be performed by said stored program computer means whereby said stored program computer means transforms the edited master document copy into a formatted form using only those content elements of said edited master document copy that have not been deleted during editing of said master document of said master specification and that meet the conditions for retention in the derivative document, which conditions are described by the support expressions of said content elements, whereby layout information is determined from the syntactic identifications of all used content elements, which said layout information is used to assemble the content description of used content elements into said formatted form of the document that is then edited by the user through said stored program computer means display output means with said user performing interactive editing thereof through said stored program computer means manual input means.

22. A structured text system as recited in claim 21, wherein the program that describes actions to be performed by the said stored program computer means wherein the formatted master document copy is edited is a word processing program.

23. A structured text system as recited in claim 1, wherein the system programs include a program or programs that describe actions to be performed by stored program computer means whereby said stored program computer means outputs a formatted representation of the edited master document copy from hardcopy output means of said stored program computer means.

24. A structured text system as recited in claim 23, wherein the program that describes actions to be performed by the stored program computer means is a word processing program that provides for the printing of the edited master document copy by hardcopy output means of said stored program computer means.

* * * * *